(12) United States Patent
Bělonožník

(10) Patent No.: US 7,664,903 B2
(45) Date of Patent: Feb. 16, 2010

(54) CONTROL UNIT WITH PCI AND SCSI BUSES AND COMPUTING SYSTEM WITH ELECTRONIC SEMICONDUCTOR DISK

(75) Inventor: Jaroslav Bělonožník, Praha (CS)

(73) Assignee: Solid Access Technologies LLC, Newburyport, MA (US)

( * ) Notice: Subject to any disclaimer, the term of this patent is extended or adjusted under 35 U.S.C. 154(b) by 0 days.

(21) Appl. No.: 10/944,895

(22) Filed: Sep. 21, 2004

(65) Prior Publication Data
US 2005/0060481 A1    Mar. 17, 2005

Related U.S. Application Data

(63) Continuation-in-part of application No. 10/081,194, filed on Feb. 25, 2002, now abandoned.

(51) Int. Cl.
G06F 13/36 (2006.01)
G06F 13/00 (2006.01)

(52) U.S. Cl. .................. 710/315; 710/300; 710/301; 710/302; 710/303; 710/304

(58) Field of Classification Search .............. 710/315, 710/300–304
See application file for complete search history.

(56) References Cited

U.S. PATENT DOCUMENTS

| | | | |
|---|---|---|---|
| 5,185,876 A | 2/1993 | Nguyen et al. | |
| 5,218,691 A | 6/1993 | Tuma et al. | |
| 5,241,508 A | 8/1993 | Berenguel et al. | |
| 5,291,584 A * | 3/1994 | Challa et al. | 703/24 |
| 5,386,385 A | 1/1995 | Stephens, Jr. | |
| 5,388,267 A | 2/1995 | Chan et al. | |
| 5,410,680 A | 4/1995 | Challa et al. | |
| 5,528,764 A * | 6/1996 | Heil | 710/113 |
| 5,555,402 A | 9/1996 | Tuma et al. | |
| 5,692,211 A | 11/1997 | Gulick et al. | |
| 5,781,719 A | 7/1998 | Hirofuji et al. | |
| 5,805,787 A | 9/1998 | Brant et al. | |
| 5,867,686 A | 2/1999 | Conner et al. | |
| 5,953,422 A * | 9/1999 | Angelo et al. | 713/185 |
| 5,987,627 A | 11/1999 | Rawlings, III | |

(Continued)

OTHER PUBLICATIONS

TIM-40 PEROM and Sysload Utility: Flash Programmable and Erasable ROM Programming Guide, Rev. 3.3.00, Spectral Signal Processing Inc., Sep. 1999, pp. 1-27.

Primary Examiner—Mark Rinehart
Assistant Examiner—Jeremy S Cerullo
(74) Attorney, Agent, or Firm—Patent GC LLC

(57) ABSTRACT

Use of a control unit with PCI bus and SCSI bus with program equipment for the electronic semiconductor disk of a computing system. The electronic semiconductor disk includes a processor and semiconductor memory, selected from a group comprising dynamic memory, synchronous dynamic memory, static memory and flash type memory. A computing system with electronic semiconductor disk with processor, where this processor is connected by a PCI bus to a PCI adapter, which is linked through the PCI bus to a semiconductor memory, connected by the local bus to a processor. The PCI adapter comprises a unit of the programmable SCSI control unit, connected both to the interface of the PCI bus for communicating with the electronic semiconductor disk, and to the interface of the SCSI bus for communicating with the external computing system with the SCSI control unit.

50 Claims, 15 Drawing Sheets

U.S. PATENT DOCUMENTS

| | | |
|---|---|---|
| 5,991,852 A | 11/1999 | Bagley |
| 6,003,017 A | 12/1999 | Rang et al. |
| 6,105,103 A | 8/2000 | Courtright, II et al. |
| 6,154,810 A * | 11/2000 | Derby et al. ................ 711/113 |
| 6,336,174 B1 | 1/2002 | Li et al. |
| 6,374,389 B1 | 4/2002 | Tuma et al. |
| 6,668,299 B1 * | 12/2003 | Kagan et al. ................ 710/305 |
| 6,754,680 B1 | 6/2004 | Motomura et al. |
| 2001/0018728 A1 | 8/2001 | Topham et al. |
| 2001/0032291 A1 | 10/2001 | Seiler et al. |

* cited by examiner

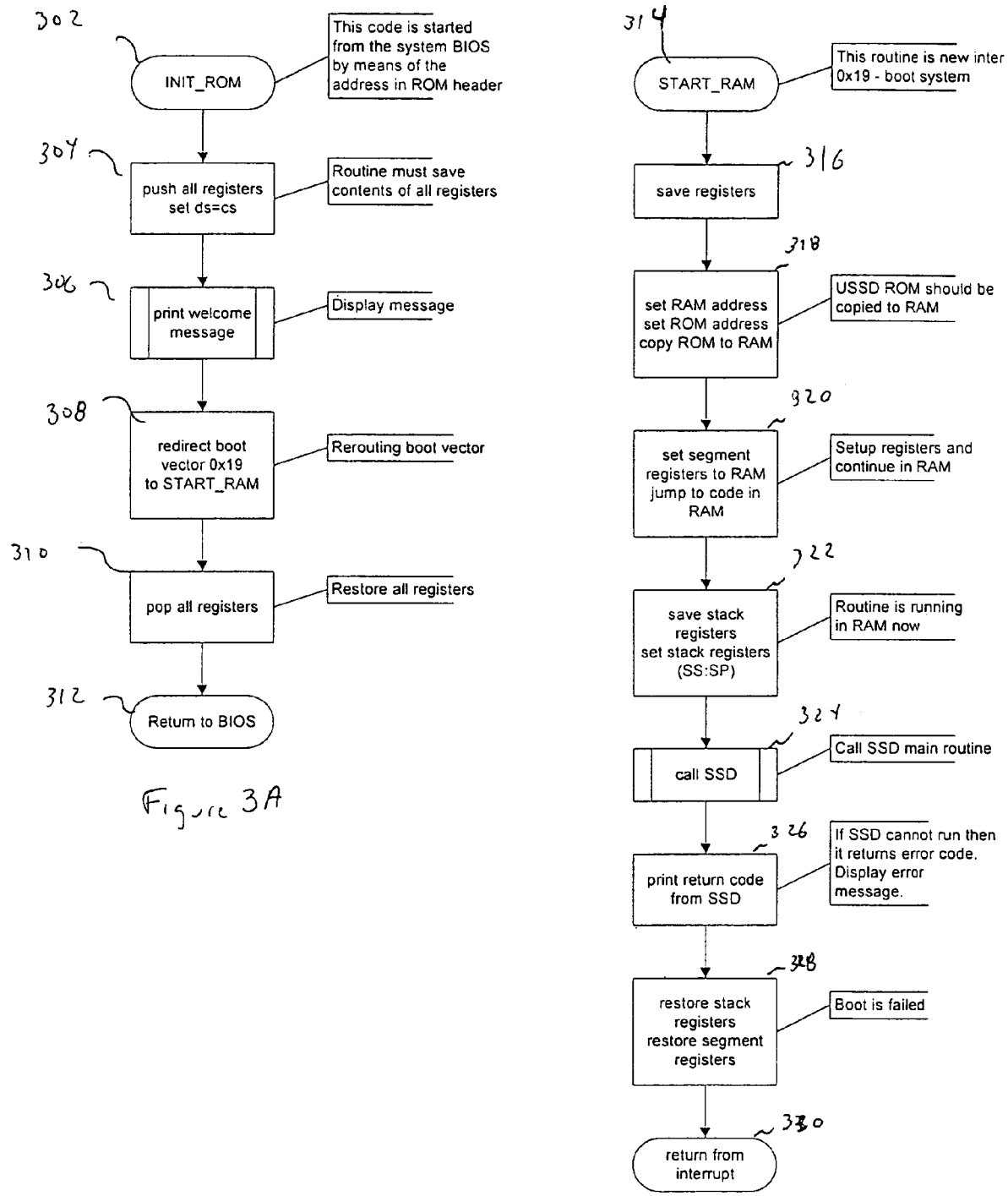

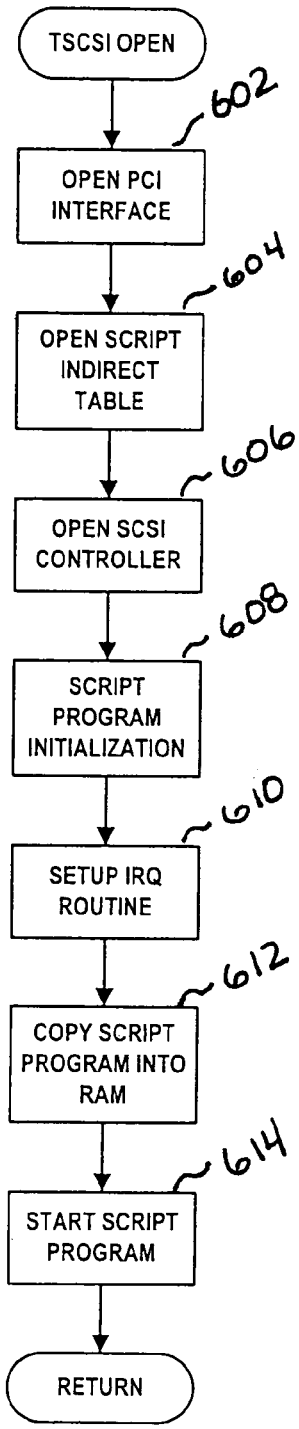
FIGURE 6A
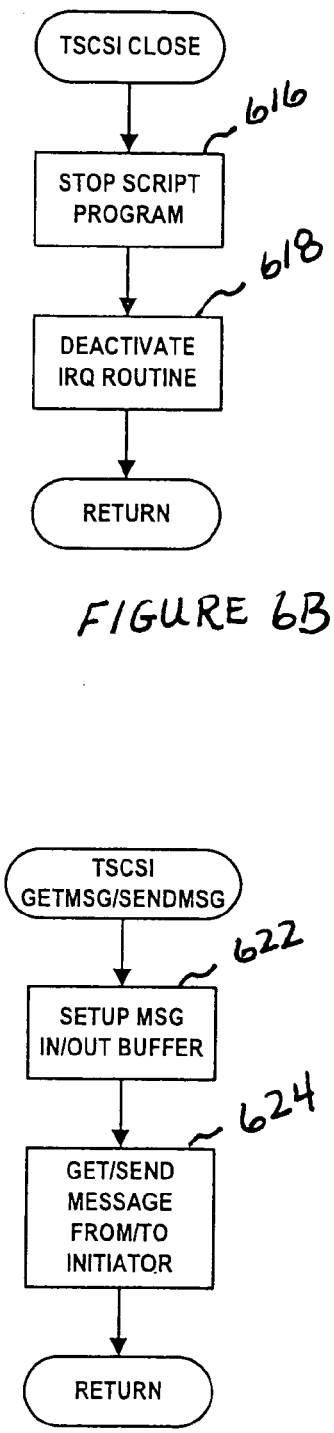
FIGURE 6B
FIGURE 6D
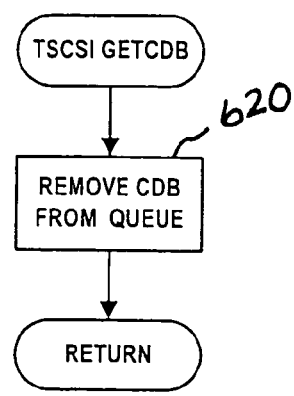
FIGURE 6C
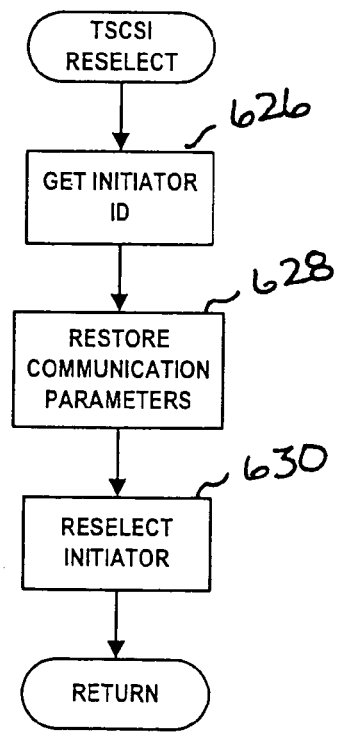
FIGURE 6E

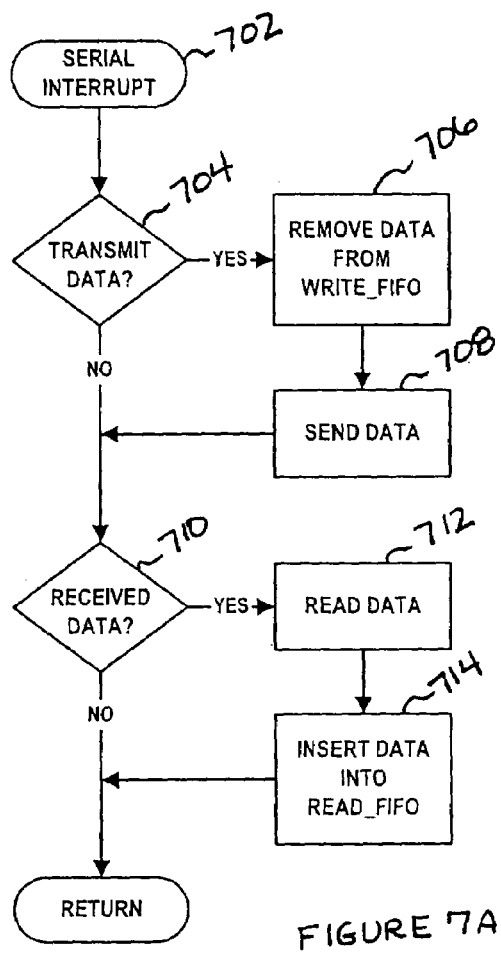
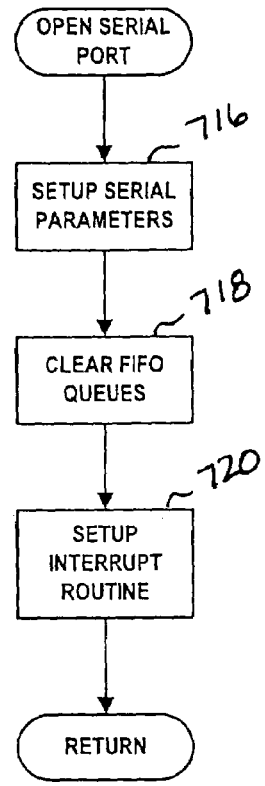
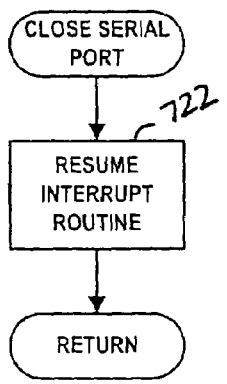
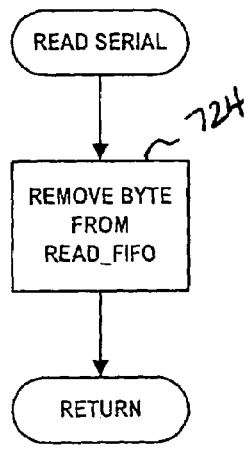
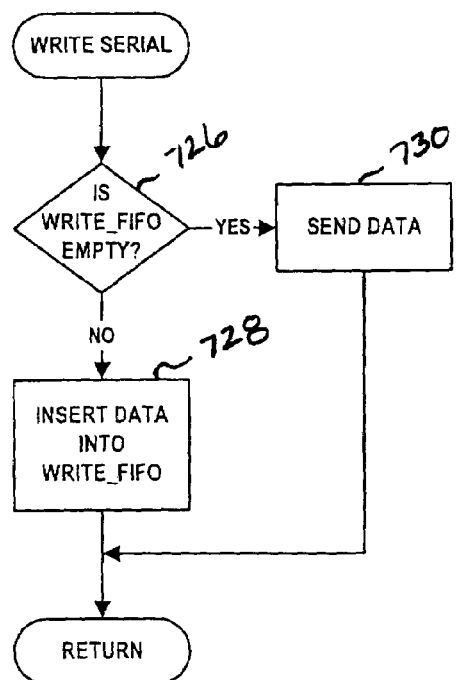
FIGURE 7A
FIGURE 7B
FIGURE 7C
FIGURE 7D
FIGURE 7E

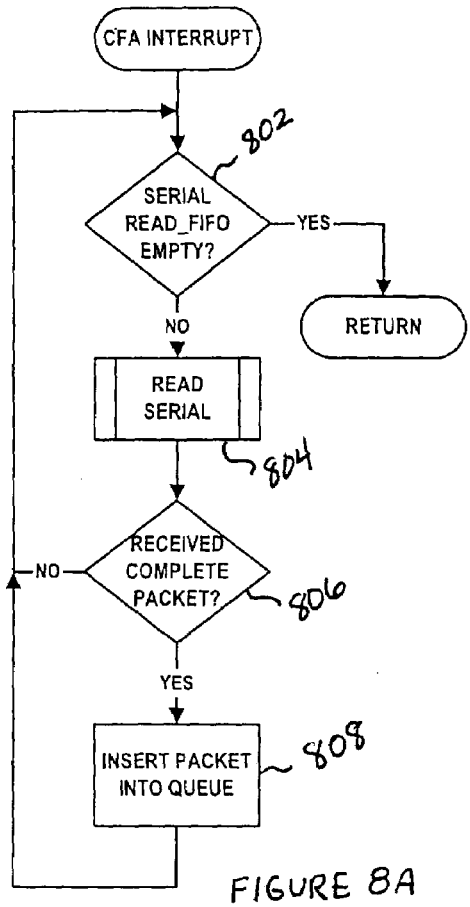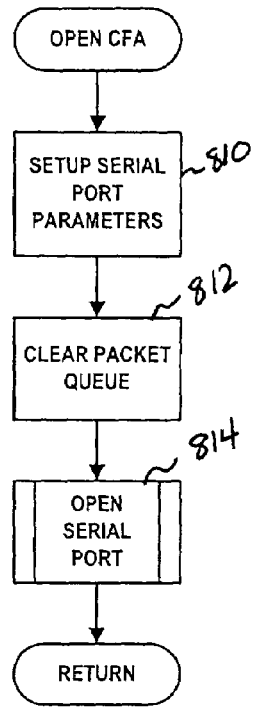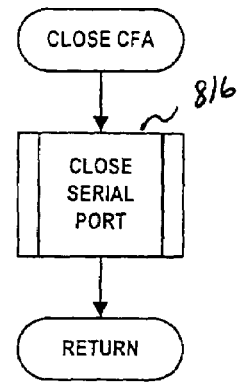
FIGURE 8A
FIGURE 8B
FIGURE 8C
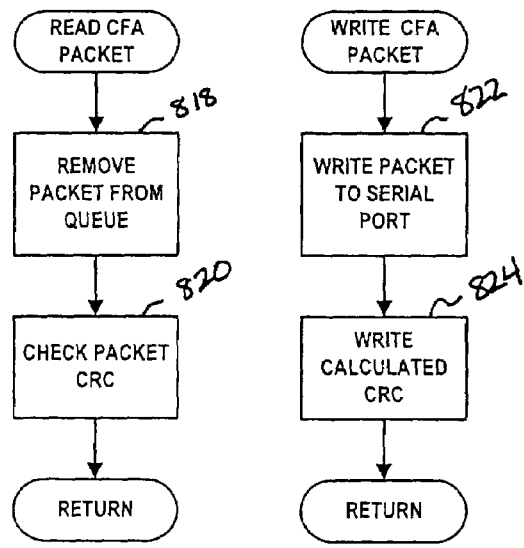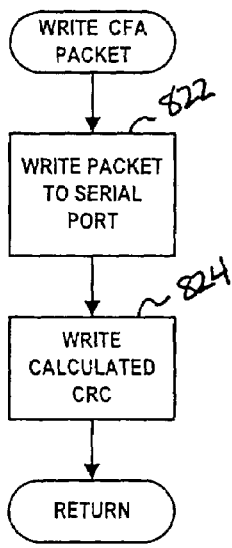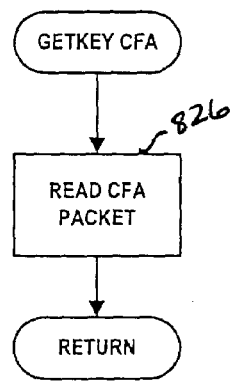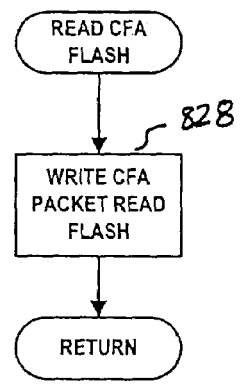
FIGURE 8D
FIGURE 8E
FIGURE 8F
FIGURE 8G

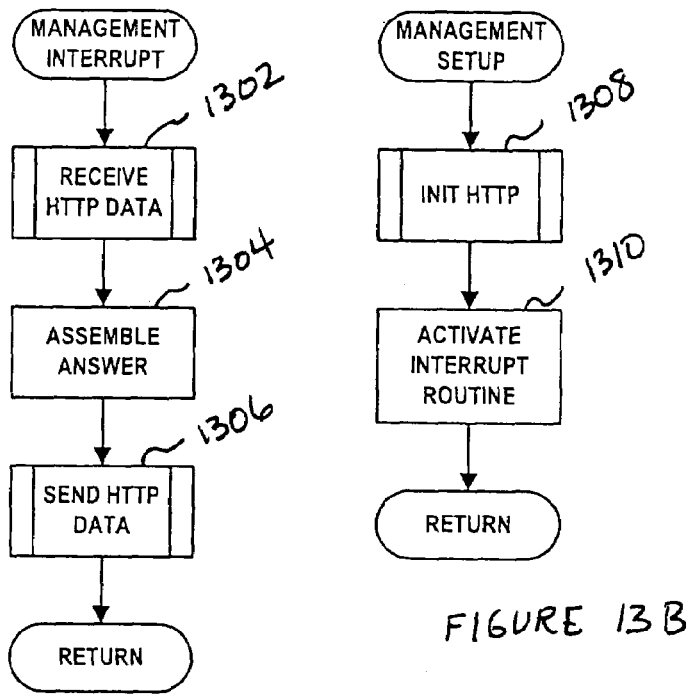
FIGURE 13A
FIGURE 13B
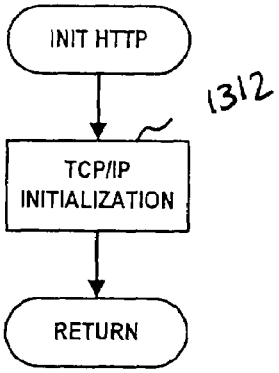
FIGURE 13C
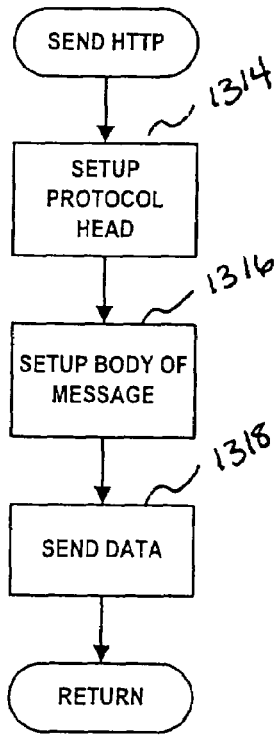
FIGURE 13D
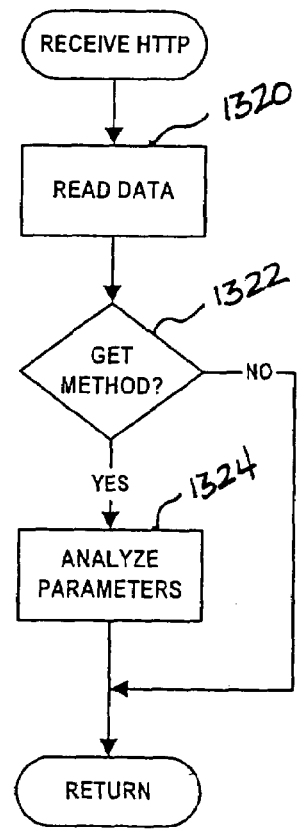
FIGURE 13E

US 7,664,903 B2

CONTROL UNIT WITH PCI AND SCSI BUSES AND COMPUTING SYSTEM WITH ELECTRONIC SEMICONDUCTOR DISK

RELATED APPLICATIONS

This application is a Continuation-in-Part of an earlier filed U.S. patent application entitled "Control Unit With PCI and SCSI Buses and Computing System with Electronic Semiconductor Disk" filed Feb. 25, 2002, Ser. No. 10/081,194 now abandoned, which is hereby incorporated herein by reference in its entirety.

FIELD

A computing system with an electronic semiconductor disk is disclosed.

BACKGROUND INFORMATION

Existing electronic semiconductor solid state disks (SSDs) used as disk capacity, such as memories of the flash EPROM type, can have slow access during recording. Improved access can be achieved with a buffer memory. However, such a memory can have a limited capacity, and the number of entries can be limited (e.g., on the order of one hundred thousand to a million in one memory location). The performance and reliability of the computing system, operating with a database stored in the memory of the electronic semiconductor SSD, can thus be reduced.

SUMMARY

An electronic semiconductor disk is disclosed for use with a computing system, the electronic semiconductor disk comprising a control unit; and a standardized interface, such as a PCI bus interface and a SCSI bus interface connected with the control unit and with program equipment for interfacing a standardized architecture, such as a PCI bus (e.g., PCI, PCI-X, DDR, PCI-EXPRESS and so forth), or a switched fabric architecture (e.g., Fibre Channel or an InfiniBand Architecture), and an external bus (e.g., a SCSI bus or SCSI compatible connection such as Fibre Channel, InfiniBand or an Internet based connection (e.g., SCSI, Ethernet)).

A computing system is disclosed which comprises an electronic semiconductor disk; a first processor connected by a standardized architecture, such as a PCI bus or switched fabric architecture, to a standardized adapter, such as a PCI adapter, the PCI adapter being a PCI bus controller linked through the PCI bus to a semiconductor memory of the electronic semiconductor disk; a local bus for connecting the electronic semiconductor disk to the processor, wherein the PCI adapter includes: a programmable SCSI control unit, connected both to an interface of the PCI bus for communicating with the electronic semiconductor memory, and to an interface of the SCSI bus for communicating with an external computing system using the programmable SCSI control unit.

An exemplary apparatus for storing data comprises a solid state memory device; a standardized architecture, such as a PCI bus or switched fabric architecture (e.g., InfiniBand), connected to the solid state memory device; and a standardized controller having an external (e.g., SCSI, iSCSI) bus interface for interfacing with a SCSI, Fiber Channel, InfiniBand or Internet communication path, and being configured to operate as a target device (e.g., SCSI target device).

An alternative apparatus for storing data is an electronic semiconductor disk, comprising a solid state memory; a standardized controller for interfacing the apparatus with the host computer; a processor programmed to detect an operating system platform of the host computer, and to adapt the standardized controller to the operating system platform of the host computer for storing information received from the host computer in the solid state memory.

A method for storing data in an electronic semiconductor disk is also disclosed which comprises placing a standardized controller connected with the electronic semiconductor disk into a SCSI target mode of operation; receiving a SCSI command associated with operation of the electronic semiconductor disk via the standardized controller; and accessing the semiconductor disk memory via a standardized architecture in response to the SCSI command.

BRIEF DESCRIPTION OF THE DRAWINGS

The attached Figures show exemplary embodiments of a computing system with an electronic semiconductor disk, wherein:

FIGS. 3A and 3B illustrate flowcharts representing an exemplary operation for loading firmware associated with operation of the FIG. 1 computing system.

FIGS. 6A-6M illustrate functionality associated with the exemplary script program of FIG. 3C used to provide SCSI target mode functionality;

FIGS. 7A-7E illustrate functionality associated with the serial module of FIG. 3C;

FIGS. 8A-8G illustrate functionality associated with the communications (CFA) module of FIG. 3C;

FIGS. 13A-13E illustrate functionality associated with the exemplary management module, http protocol module and TCP packet driver of FIG. 3C.

DETAILED DESCRIPTION OF THE PREFERRED EMBODIMENT

Figure 1:
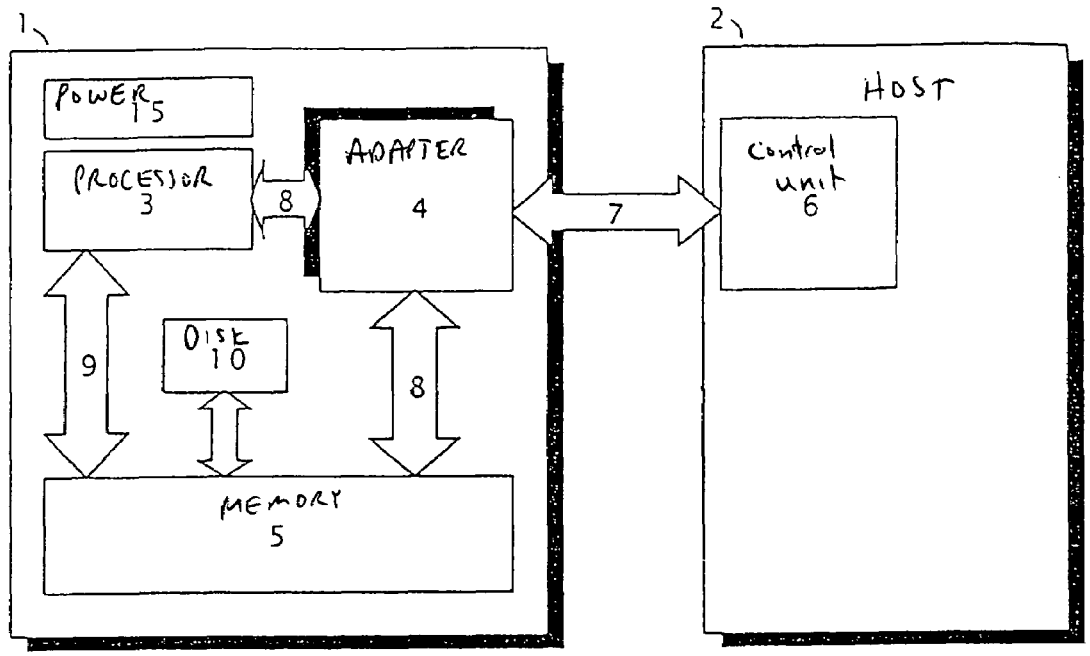
FIG. 1 is a block diagram of an exemplary computing system with an electronic semiconductor disk.

The FIG. 1 computing system 1 constitutes an apparatus for storing data which includes a solid state memory device, such as the semiconductor memory 5. The electrical semiconductor disk includes semiconductor memory 5, selected from a group comprising dynamic memory, synchronous dynamic memory, static memory and flash type memory. The semiconductor memory can optionally include a synchronous dynamic memory (SDRAM). Read and write can be faster than in an EPROM flash type memory and the number of recordings in the memory is not limited.

A standardized controller is represented as an adapter 4. As referenced herein "standardized" refers to a controller which is configured in accordance with any recognized industry standard, as opposed to a dedicated, device specific controller. The adapter 4 can be an adaptor of a shared bus architecture, such as a PCI adapter associated with the Peripheral Component Interface (PCI) bus; that is, a controller associated with PCI and its variants including, but not limited to PCI-X, PCI-EXPRESS and PCI-DDR. Alternately, the standardized controller can include an adapter configured to provide an interface in accordance With a switched fabric architecture, such as a Fibre Channel interface, and/or in accordance with any known InfiniBand architecture and specification for data flow between processors and I/O devices. A switched fabric architecture such as the InfiniBand Architecture uses host channel adapters and target channel adapters, and provides point-to-point connections between hosts and I/O devices. In an exemplary embodiment, the adapter 4 can operate in a target mode as SCSI device on an external, InfiniBand compatible bus 7.

For purposes of illustration of principles described herein, an exemplary embodiment will be described in the context of a PCI bus controller having a PCI adapter associated with a SCSI control unit. The exemplary FIG. 1 PCI bus controller can be associated with, and/or include, at least a portion 12 of a SCSI bus interface.

The PCI bus controller is configured to operate as a SCSI target device situated on an external bus, such as a SCSI bus 7, or on a Fibre Channel, InfiniBand, or Internet link. The external bus, or link, is connected with an external computing system, represented as a host computer 2 (which can be considered to represent one or most host computers). In the case of a switched fabric architecture such as the InfiniBand Architecture, the standardized controller can include a target channel adapter operated as a SCSI target device. With a switched fabric architecture (e.g., InfiniBand), communications with the adapter 4 can be in the form of the SCSI target mode protocol wrapped within an InfiniBand compatible protocol, where the InfiniBand compatible protocol is used to establish a communication link. The external bus can also be a Fibre Channel connection which operates in accordance with the SCSI protocol, or an Internet connection (e.g., Ethernet) using TCP/IP and iSCSI.

The computing system 1 can include a computer with any suitable processor 3, a fast solid state memory 5, and a bus 8 such as any PCI bus or InfiniBand compatible bus. In the FIG. 1 example, a central processing unit is used as processor 3 and is connected by a PCI bus 8 to a PCI adapter 4, which is linked through the PCI bus 8 to the semiconductor memory 5. The semiconductor memory can also be connected by a local bus 9 to the processor 3.

Figure 2:
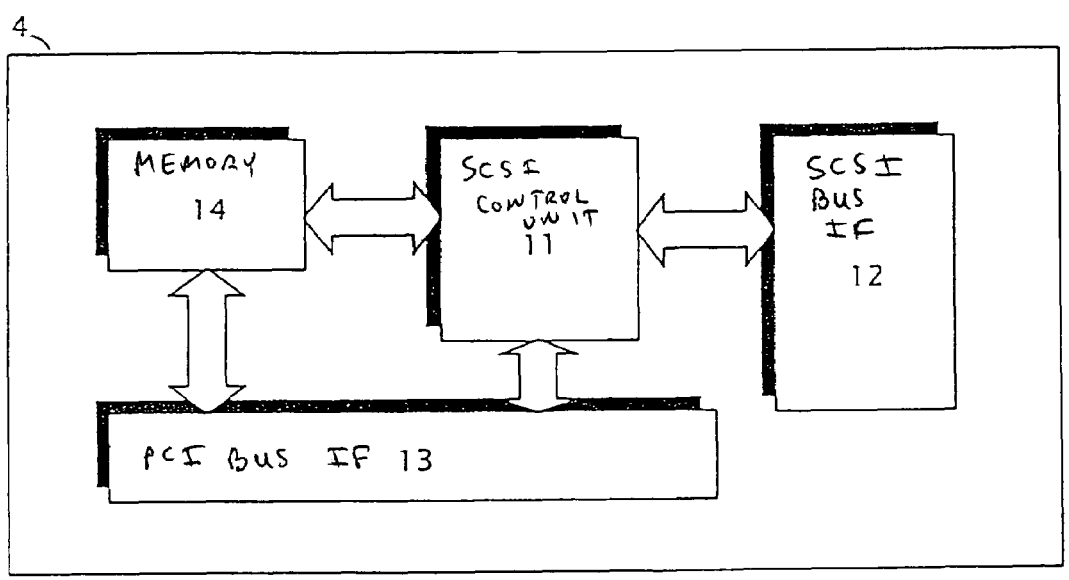
FIG. 2 shows an exemplary internal structure of a PCI adapter, which is a part of the FIG. 1 computing system.

FIG. 2 shows additional details of an exemplary PCI adapter 4, although an adapter of a switched fabric architecture can be similarly configured. As shown in FIG. 2, a programmable SCSI control unit 11 is connected both to an interface 13 of the PCI bus 8 for communicating with the semiconductor memory 5, and to an interface 12 of the SCSI bus 7 for communicating with the host computer 2 of FIG. 1 via the host computer's SCSI control unit 6. A memory unit 14 of FIG. 2 is connected to the programmable SCSI control unit 11 in the PCI adapter 4 and/or to the interface 13 of the PCI bus for communicating with the semiconductor memory 5 of the electronic semiconductor disk.

Referring to FIG. 1, requests made by the host computer 2 (for example, for reading from or recording onto the electronic semiconductor disk), go to the computing system 1 with electronic semiconductor disk via the SCSI bus 7. The SCSI requests are translated, when appropriate into PCI bus requests via program equipment stored in the electronic semiconductor disk and accessed by the PCI adaptor 4. Through the PCI bus 8, required data are written into or read from the semiconductor memory 5. The processor 3 of the electronic semiconductor disk at the same time can control the PCI adapter 4 and evaluate the requests from the host computer 2.

In an exemplary embodiment, the SCSI control unit 11 within PCI adapter 4, and/or the processor 3, can be programmed to detect an operating system platform of the host computer, and to adapt the computing system 1 to the operating system platform of the host computer to accommodate storage of data received from the host computer. Such an operation can be performed during an initialization procedure.

The PCI adapter can possess a processing capability with inclusion of the programmable SCSI control unit 11. The programmable SCSI control unit can determine whether a request for command, received via the SCSI bus 7, can be handled autonomously by the PCI adapter 4. If the request for command received via the SCSI bus 7 is one which the programmable SCSI control unit 11 is incapable of handling, an interrupt can be generated to the processor 3.

Generally speaking, in an exemplary embodiment, the processor 3 can handle read, write, and synchronization commands associated with the semiconductor memory 5. The programmable SCSI control unit 11 of the PCI adapter 4 can handle general commands, such as test unit ready, seek, and reserve/release units associated with a SCSI controller. In an exemplary embodiment, when information to be read from or written to the semiconductor memory 5 is received via SCSI bus 7, it is translated by the programmable SCSI control unit 11 for transmission via the PCI bus of the computing system 1. An interrupt is then generated to the processor 3 so that the actual read or write operations can be performed via the PCI bus 8.

The processor 3 can also communicate at initialization of the computing system 1 with the semiconductor memory 5 via the local bus 9. During an exemplary initialization process, an operating system stored within the computing system 1 is uploaded to the processor 3 for purposes of conducting read/write operations via the PCI bus 8. All of these operations will be described in greater detail below.

As shown in FIG. 2, the PCI adapter 4 can optionally contain a memory unit 14 which is connected to the portion 11 of the programmable SCSI control unit in the PCI adapter 4 and/or to the PCI bus interface 13 of the PCI bus for communicating with the electronic semiconductor disk. The memory 14 unit of the PCI adapter can be a programmable EPROM, PEROM, EEPROM and/or flash EPROM memory, or any other suitable memory. The memory unit 14 of the PCI adapter can have a built-in program for controlling the portion of the SCSI control unit 11 of the programmable SCSI bus in the PCI adapter 4.

The computing system 1 with electronic semiconductor disk can be connected by the SCSI bus 7 to an external computing system such as the host computer 2 of FIG. 1, from which it receives requests, for example, for reading from or recording onto the semiconductor memory 5. The requests can be accessed by the program equipment of the SCSI control unit 11 in the PCI adapter 4. Through the PCI bus 8, the required data can be entered into or read from the semiconductor memory 5 configured using, for example, SDRAM.

The operating system program which is implemented by the processor 3 can be stored in the memory unit 14 (e.g., EPROM) of the PCI adapter 4 and accessed via the local bus 9 at system initialization. In an alternative embodiment, this program, or any part thereof, can be stored in the semiconductor memory 5 or in a disk drive 10, or any other location.

To the host computer 2, the computing system 1 appears as a typical target disk unit on the SCSI bus, which can have a constant data transfer speed for recording and readout. The computing system 1 can possess special properties, such as significant reduction in the time taken to access the disk. For example, access times can be reduced from tens of milliseconds to units of a microsecond. The electronic semiconductor disk can contain only electronic parts, compared to a conventional disk, which has mechanically moving parts. The reliability and life span of the disk can thereby be increased.

Before disconnecting the electronic disk, the content can be optionally recorded onto an internal conventional magnetic disk 10, or the whole electronic disk can be equipped with an optional standby power supply unit 15. This alternative serves to permit protection of the data even after disconnection of the electronic semiconductor disk, when its content is automatically recorded on the internal magnetic disk.

The FIG. 1 computing system 1 can use industry standard, off-the-shelf components managed by a software operating system configured in accordance with exemplary embodiments of the present invention. The computing system 1 can be configured on a conventional mother board having PCI slots, memory modules, a processor circuit, a serial port RS-232 and an Ethernet port. The PCI adapter 4 can be any suitable PCI controller having a SCSI control unit 11 and/or with a parallel switched fabric (e.g., Fibre Channel interface). Alternately, the adapter can be a controller having an Infini-Band architecture and specification for data flow as already mentioned, or other suitable controller that can include an adapter operable in a SCSI target mode (e.g., target mode).

The processor 3 can be any suitable processor having appropriate cooling. The solid state disk memory can be configured using memory modules, such as readily available DIMM Memory Modules. A control panel can be provided with an LCD display and keyboard interface connected via the serial port RS-232. The hard disk 10 can be a replaceable SCSI hard disk having installed programming capability and space for solid state disk data back.

The motherboard's basic computer components can include a readily available chip set used for maintaining communication between the processor 3, memory 5 and PCI expansion slots. The motherboard's components include an Intel Xeon processor socket for the processor 3, DIMM slots for memory modules and memory subsystems with supporting ECC capability, supporting fast SDRAM DDR and a sufficient number of DIMM slots to achieve desired memory capacity. Expansion 64-bit PCI slots can be included for SCSI adapter installation. The serial port RS-232 and an integrated SCSI control unit connecting with an internal SCSI disk can also be provided.

The PCI adapter 4 is an expansion board for a PCI slot, and includes the programmable SCSI control unit. The PCI bus interface can be a PCI 64-bit/66 MHz bus interface, and the SCSI interface 12 can be a channel 1 internal connector.

The PCI adapter 4 is configured to be programmable, and to support a SCSI target mode functionality. As such, the controller chips are configured to allow for the use of SCSI interface as a disk subsystem. An LSI logic controller, or any other suitable controller capable of operating in a target mode, can be used as the SCSI control unit 11.

The two-channel SCSI control unit includes a first channel with an external connector to support the solid state disk system, while the second channel connects to an internal SCSI hard disk to serve as a hard data backup.

The internal hard disk 10 of the exemplary FIG. 1 architecture can be swappable, using an insertable single connector attachment (SCA) version of the module. The backup hard disk can have greater capacity than the total solid state disk system capacity, and can include storage room for an operating system as well as for backup data stored in the solid state disk.

For initializing and installing the solid state disk memory and its proprietary operating system, a program for setting parameters and areas in an internal disk of the computing system can be provided. During installation, a configuration file is created to set basic initial parameters used during system startup. Configuration file can include system identification, control identification for the control unit 11, the size of the logical block, the solid state disk memory size, the data buffer size and maximum size of transferred data, and implicit address of the PCI adapter 4 identification, and a system serial number.

Initializing software includes programming tools for programming an operating system of the computing system 1 into memory, and the startup of such a program. If the operating program is placed into a flash EEPROM memory 14 of the PCI adapter 4, the start-up program is stored in the same memory. Alternately, the operating program is set or implemented from an internal disk in the program area. The start-up program is stored in the first disk sector (the boot sector) and partially in the program area of the internal disk. In both cases, the set-up program is activated using BIOS program tools of the mother board.

The program which manages the system operation can be stored on an internal hard disk 10 or in the EEPROM program memory 14 of the PCI adapter 4. This program can be managed by processes arriving from the control unit 11, DMA (direct memory access-specification that provides a common interface for accessing and searching document databases) memory controller, and the control panel. Processes from the controller can be signaled by interrupts, and the operating program can include the routine of such interruptions. It performs particular requests, and in the case of an SCSI command, stores requests as command sequences. The actual executing process reads SCSI commands from such a sequence and executes them.

The electronic semiconductor disk can be used in heavy load database transactions or in applications which require disk access in real constant time (e.g., control of technological processes, making audio visual recordings etc.) The use of the industry standard PCI bus makes possible the use of the PCI adapter 4 in various computer systems. From the external viewpoint, the PCI adapter has a connection which uses industry standard PCI and SCSI that renders the computing system 1 universally applicable. Thus, the computing system 1 can be configured with a PCI bus to access the semiconductor memory 5. However, the computing system 1 can be configured to communicate with the host computer 2 via a SCSI bus, with the PCI adapter 4 being configured as a SCSI target device.

When two SCSI devices communicate on the SCSI bus, such as the SCSI bus 7 of FIG. 1, one device acts as an initiator and the other device acts as a target. The initiator originates an operation and the target performs the operation. With a SCSI bus communication, there can be any combination of initiator devices (initiators) and target devices (targets) provided there is at least one of each.

Certain SCSI bus functions are assigned to the initiator and certain SCSI bus functions are assigned to the target. For example, the initiator may arbitrate for the SCSI bus and select a particular target. The target may request the transfer of command, data, status, or other information on the data bus, and in some cases it may arbitrate for the SCSI bus and reselect an initiator for the purpose of continuing an operation. Information transfers on the data bus are asynchronous and follow a defined REQ/ACK handshake protocol.

In the exemplary FIG. 1 embodiment, the programmable SCSI control unit 11 of the PCI adapter 4 performs the functions of a SCSI bus target. The SCSI controller 6 of the host computer 2 functions as a SCSI bus initiator.

SCSI Operation

There are 11 SCSI signals typically used for control, and 36 SCSI signals are used for data (messages, commands, status and data), including parity. These signals are as follows:

a) BSY (BUSY). An OR-tied signal that indicates that the SCSI bus is being used.

b) SEL (SELECT). An OR-tied signal used by an initiator to select a target or by a target to reselect an initiator.

c) C/D (CONTROL/DATA). A signal driven by a target that indicates whether CONTROL or DATA information is on the DATA BUS. True indicates CONTROL.

d) I/O (INPUT/OUTPUT). A signal driven by a target that controls the direction of data movement on the DATA BUS with respect to an initiator. True indicates input to the initiator. This signal is also used to distinguish between SELECTION and RESELECTION phases.

e) MSG (MESSAGE). A signal driven by a target during the MESSAGE phase.

f) REQ (REQUEST). A signal driven by a target to indicate a request for an acknowledgment (ACK) information transfer handshake.

g) REQB (REQUEST). A signal driven by a target to indicate a request for an acknowledgment B (ACKB) information transfer handshake.

h) ACK (ACKNOWLEDGE). A signal driven by an initiator to indicate an acknowledgment for a request (REQ) information transfer handshake.

i) ACKB (ACKNOWLEDGE). A signal driven by an initiator to indicate an acknowledgment for a request B (REQB) information transfer handshake.

j) ATN (ATTENTION). A signal driven by an initiator to indicate the ATTENTION condition.

k) RST (RESET). An OR-tied signal that indicates the RESET condition.

l) DB(7-0,P) (DATA BUS). Eight data-bit signals, plus a parity-bit signal that form a DATA BUS. DB(7) is the most significant bit and has the highest priority during the ARBITRATION phase. Bit number, significance, and priority decrease downward to DB(0). A data bit is defined as one when the signal value is true and is defined as zero when the signal value is false. Data parity DB(P) shall be odd. Parity is undefined during the ARBITRATION phase.

m) DB(31-8,P1,P2,P3) (DATA BUS). Twenty-four data-bit signals, plus three parity-bit signals that form an extension to the DATA BUS. DB(P1,P2,P3) are parity bits for DB(15-8), DB(23-16), and DB(31-24) respectively. A data bit is defined as one when the signal value is true and is defined as zero when the signal value is false. Data parity DB(Px) shall be odd.

SCSI signals are used in an input/output (I/O) process that includes one or more SCSI bus phases. The various SCSI phases include:

1) BUS FREE phase. BUS FREE phase begins when the SEL and BSY signals are both continuously false for a bus settle delay. It ends when the BSY signal becomes true 2) ARBITRATION phase.

At least one bus free delay after first detecting BUS FREE phase, but no more than a bus set delay after the bus was last free, the initiator asserts the BSY signal and its assigned SCSI device ID bit on the DATA BUS. The initiator waits an arbitration delay, then examines the DATA BUS. If a higher priority SCSI device ID bit is true, the initiator loses arbitration and may release the BSY signal and its SCSI ID bit. Otherwise, the initiator wins arbitration and asserts the SEL signal. All SCSI devices must release the BSY signal and their SCSI ID bit within a bus clear delay after the SEL signal becomes true (even if they have not yet examined the DATA BUS). The winning SCSI device waits at least a bus clear delay plus a bus settle delay after asserting the SEL signal before changing any signals on the bus.

3) SELECTION phase. The I/O signal is false during this phase to distinguish it from the RESELECTION phase.

The target determines that it is selected when the SEL signal and its SCSI ID bit are true and the BSY and I/O signals are false for at least a bus settle delay. The target then asserts the BSY signal within a selection abort time after it last determined that it was still being selected. (The target is not required to respond to a selection within a selection abort time; but it must ensure that it will not assert the BSY signal more than a selection abort time after the initiator aborts a selection attempt.)

At least two deskew delays after the initiator detects the BSY signal is true, it releases the SEL signal.

4) MESSAGE OUT phase. During this phase the initiator sends an IDENTIFY message to the target. The target asserts the C/D and MSG signals and negates the I/O signal for the message transfer. After detecting the assertion of the REQ signal, the initiator negates the ATN signal before asserting the ACK signal. (Refer to the handshake procedure for the command phase.)

5) COMMAND phase. The target asserts the C/D signal and negates the I/O and MSG signals for all of the bytes transferred during this phase. The direction of transfer is from the initiator to the target. HANDSHAKE PROCEDURE: The target asserts the REQ signal. Upon detecting the REQ signal is true, the initiator drives the DATA BUS to the desired value, waits at least one deskew delay plus a cable skew delay and then asserts the ACK signal. The initiator continues to drive the DATA BUS until the REQ signal is false. When the ACK signal is true at the target, the target reads the DATA BUS and then negates the REQ signal. When the REQ signal becomes false at the initiator, the initiator may change or release the DATA BUS and negate the ACK signal. The target may continue to request command bytes by asserting the REQ signal again. The number of command bytes is determined by the group code (most significant 3 bits) that is contained in the first command byte.

6) DATA IN phase. The target asserts the I/O signal and negates the C/D and MSG signal for all of the bytes transferred during this phase. The direction of transfer is from the target to the initiator.

HANDSHAKE PROCEDURE: The target first drives the DATA BUS to their desired values, waits at least one deskew delay plus a cable skew delay, and then asserts the REQ signal. The target continues to drive the DATA BUS until the ACK signal is true. When the REQ signal is true at the initiator, the initiator reads the DATA BUS and then asserts the ACK signal. When the ACK signal is true at the target, the target may change or release the DATA BUS and negate the REQ signal. When the REQ signal is false at the initiator, the initiator negates the ACK signal. After the ACK signal is false, the target may continue the transfer by driving the DATA BUS and asserting the REQ signal as described above.

7) DATA OUT phase. The target negates the C/D, I/O, and MSG signals for all of the bytes transferred during this phase.

The direction of transfer is from the initiator to the target. (Refer to the handshake procedure for the command phase.)

8) STATUS phase. The target asserts the C/D and I/O signals and negates the MSG signal for the byte transferred during this phase. The direction of transfer is from the target to the initiator. (Refer to the handshake procedure for the DATA IN phase.)

9) MESSAGE IN phase. The target asserts the C/D, I/O, and MSG signals during the byte transferred during this phase. Typically, a command COMPLETE message would be sent at this point. The direction of transfer is from the target to the initiator. (Refer to the handshake procedure for the DATA IN phase.)

10) BUS FREE phase. The target returns to BUS FREE phase by releasing the BSY signal. Both the target and the initiator release all bus signals within a bus clear delay after the BSY signal is continuously false for a bus settle delay.

O/S Firmware

Having described general SCSI operation between an initiator (e.g., host 2) and a target (e.g., computing system 1), methods of storing the semiconductor disk memory operating system (O/S) firmware will be described. The operating system firmware of the FIG. 1 computing system 1 can be placed in a non-volatile memory, such as memory unit 14 of the adapter 4, or can be stored on an internal disk, such as the disk 10 of the computing system, or at any other suitable location.

Where the operating system of the computing system 1 is stored on the internal disk 10, it can be easily maintained and upgraded. The internal disk can, for example, be a SCSI or ATA/IDE hard disk, and can be divided into several logical areas. A first sector (master boot sector) of the disk can include a partition table that contains the initial address and size of other areas. There can be two additional areas defined on the disk. The first area is a partition that contains the operating system, the software for computing system 1 and configuration data. This area can be prepared in standard file system FAT16 format of the DOS operating system. The second area can be a partition assigned for memory mirroring. The boot sector can contain a program code, executed by a BIOS system, for loading of an operating system that activates the software of computing system 1.

Where the operating system firmware for the computing system 1 is stored within memory unit 14 of a PCI adapter 4, the PCI adapter implements PCI configuration space within which its PCI configuration registers reside. The following configuration registers of the standardized PCI specification are used for implementation of the exemplary FIG. 1 embodiment:

BAR0 (Base Address Register Zero) at offset 0×10

This base address register is used to map an operating register set into I/O space. The controller uses 256 bytes of I/O space for this base address register.

BAR1-2 (Base Address Register One-Two) at Offset 0×14

These base address registers map SCSI operating registers into memory space.

BAR3-4 (Base Address Register Three-Four) at offset 0×1C

These base address registers are used to map a SCRIPT RAM into memory space.

ERBA (Expansion ROM Base Address) at offset 0×30

This base address register is used to map expansion ROM/EEPROM used to store the operating system firmware of the exemplary FIG. 1 computing system.

Where the operating system is stored in a nonvolatile memory, such as a flash memory unit 14 of the PCI adapter 4, it need not use any operating system services, but can directly access ports and BIOS services.

The PCI specification provides a mechanism where a device can provide expansion ROM code that can be executed for the PCI device. The expansion ROM can contain the following information:

A length code is provided to identify the total continuous address space.

A code indicator identifies the type of executive code.

A revision level for the code and data on the ROM is provided.

The Vendor and Device ID of the supported PCI device are included in the ROM.

A jump to the initialization code.

The expansion ROM (with one code image) can be configured to include a ROM header, PCI data structure, code and data, and checksum byte.

The PCI Data Structure can be located in the first 64 KB of the ROM image and is DWORD aligned. It contains the following information:

In the PCI data structure, the four signature bytes provide a unique signature for the PCI Data Structure. The vendor identification and device identification are each 16-bit fields with the same definition as the field in the configuration space for this device. The PCI data structure length can be a 16-bit field that defines the length of the data structure from start of the data structure. This field can be in little-endian format and in units of bytes.

In an exemplary embodiment, the PCI data structure revision is an 8-bit field that identifies the data structure revision level. The class code is a 24-bit field with the same definition as the field for the configuration space for this device. The image length is a two-byte field that represents the length of the image. This field is in little-endian format and the value is in units of 512 bytes. The revision level is a field that contains revision level of the code in the ROM image. The code type is a one-byte field that identifies the type of code contained in this section of the ROM. The code may be executable binary for specific processor or interpretive code. The code for Intel x86 and PC-AT compatible is 0. The indicator includes a bit which represents whether or not this is the last image in the ROM. A value of 1 indicates last image in ROM. Bits 0-6 are reserved.

The operating system firmware for the computing system 1 obtained from the memory unit 14 and/or the disk drive 10 is used to boot up the processor 3 of the computing system 1 using the routines illustrated in the flowcharts of FIGS. 3A and 3B. In step 302 in FIG. 3, the firmware is initiated from the system BIOS using an address in the ROM header. In step 304, the contents of all registers are saved using a push operation. In step 306, a welcome message is displayed, and in step 308, the boot vector is routed. In step 310, all registers are restored using a pop operation, after which operation returns to the BIOS in step 312.

The rerouting of the boot vector in step 308 initiates the functionality associated with the flowchart of FIG. 3B. Using the operating system firmware, a transfer of the operating system into a RAM of the computing system 1 is performed at block 314, and all registers are saved in step 316. In step 318, contents of the ROM are copied to the RAM for dynamic access. In step 320, all registers are set up, and operation is continued using the contents of the RAM. In step 322, the routine is running in the RAM, at which time stack registers are saved and set. In step 324, a main routine for the operating system of the semiconductor memory is called, such as the routine of FIG. 4. If this operating system cannot run, an error code is returned and displayed in step 326. In step 328, stack registers are restored, after which a return from the interrupt occurs in step 330.

Computing System O/S Functionality

Upon accessing the firmware associated with the operating system of the computing system 1, operating software components of the computing system 1 can be used to manage system operation whereby the computing system 1 can interface with a SCSI bus. The operating system components are modular software components of a universal solid state disk program 338 shown in FIG. 3C. The FIG. 3C operating system software is managed by processes arriving from the programmable SCSI control unit 11, processor 3 and a user interface (or control panel). Processes from the programmable SCSI control unit are signaled by interruption, and the operating software contains the routines of such interruptions. It performs requests, and in the case of a SCSI command, stores requests as command sequences. The actual executing process reads SCSI commands from such a sequence and executes them.

Figure 3C:
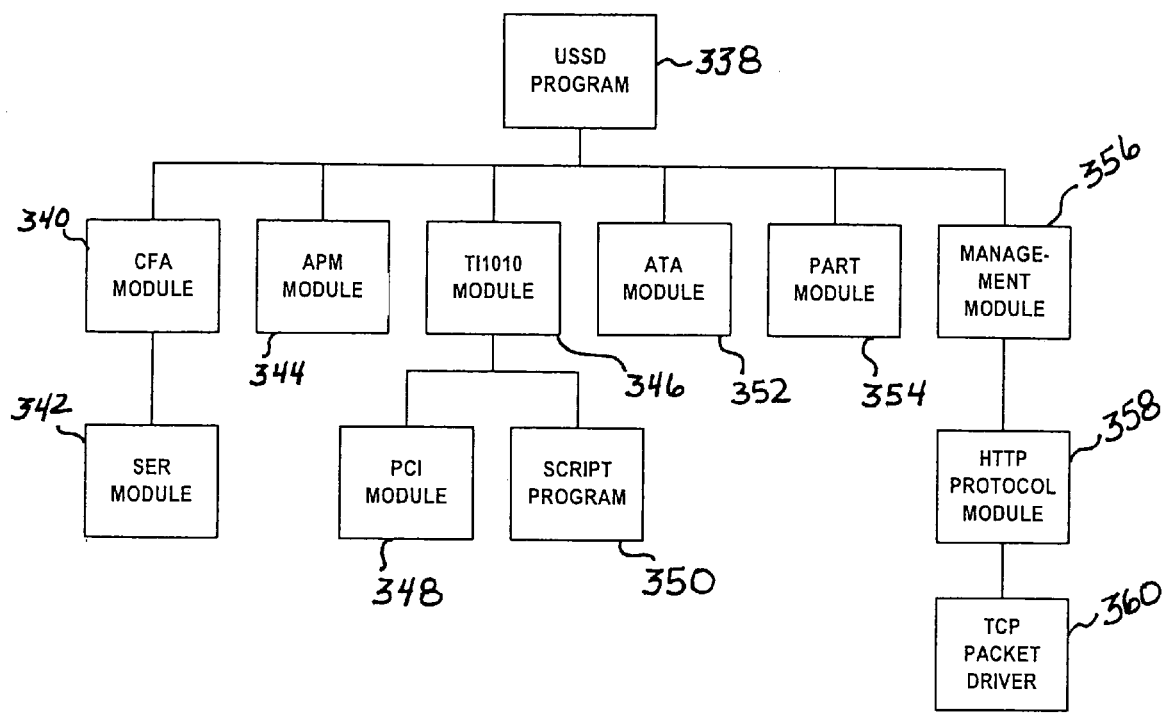
FIG. 3C shows modules of exemplary operating system software for the computing system of FIG. 1.

In FIG. 3C, a target interface TI_1010 module 346 allows the PCI-based computing system 1 of FIG. 1 to operate as a target device on the SCSI bus 7. This module is used for communications of the programmable SCSI control unit 11, and can be an LSI Logic controller, chip model # LSI, 53C1010-66 or any other suitable controller. This controller is programmable and supports a SCSI "target" mode of operation. The SCSI control unit 11 is programmable using scripts of script program module 350. The programmable SCSI control unit is controlled by an integrated scripts processor, and SCSI functions can be programmed using the script program 350. This programmability allows the SCSI control unit 11 of the PCI adapter 4 to be set and managed in a disk subsystem mode, by which the host computer 2 can access the PCI-based electronic memory 5 using the SCSI bus 7 and functionality of a PCI module 348 to interface with the PCI bus 8 of FIG. 1 using, for example, BIOS interrupt services.

The CFA module 340 is used for communications with CFA (user interface) devices, such as an LCD display and user's keyboard of the control panel. These communications can be serial communications via SER interface module 342 used for serial communications on a serial port RS-232.

An APM module 344 is used for communications to provide advanced power management (APM).

An ATA module 352 is used for communication with extended fixed disk services such as the disk drive 10. The module communicates with extended fixed disk using BIOS interrupt services.

A partition (part) module 354 is used for manipulations with the master boot record (MBR) stored in a partitioned area of memory on the disk drive 10.

A management module 356, http protocol module 358 and TCP packet driver module 360 are provided for remote management (e.g., via the Internet) of the operating system functions using, for example, http and TCP standards.

Figure 4:
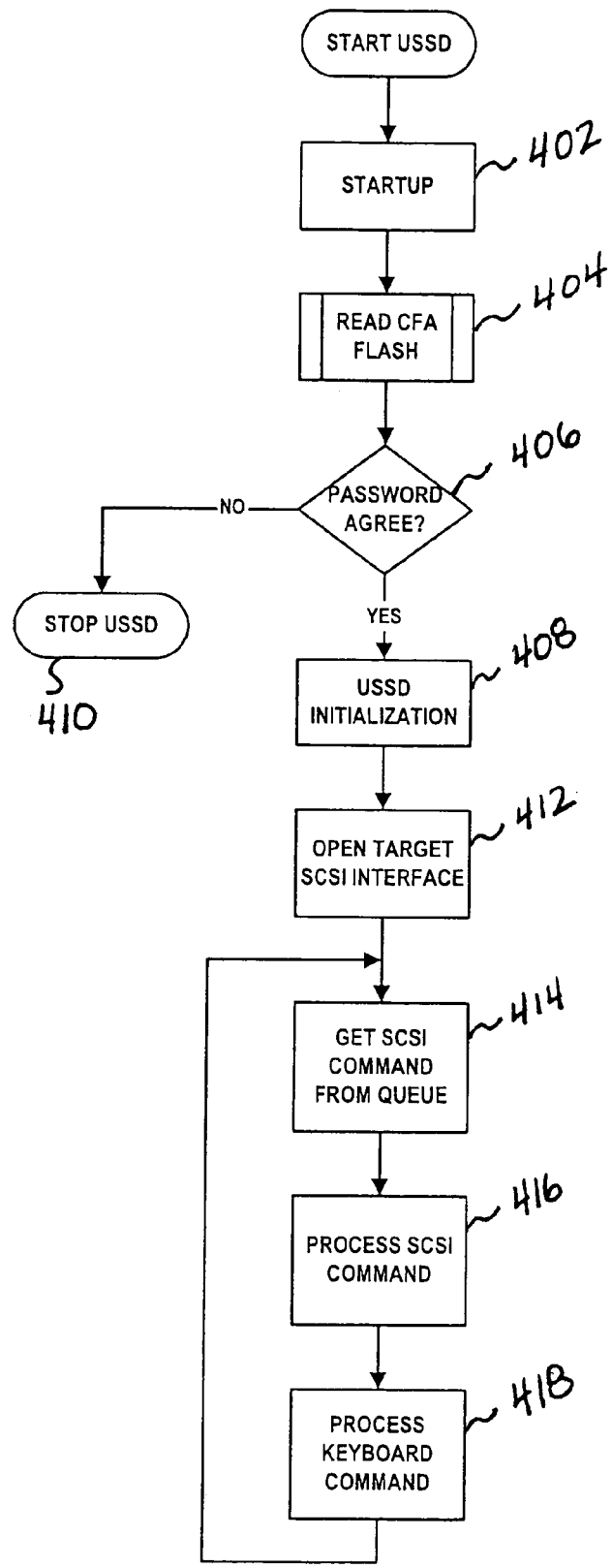
FIG. 4 illustrates functionality associated with start-up of the operating system software.

FIG. 4 shows an exemplary program of the universal solid state disk program 338 executed during start up and initialization of the computing system 1 in a SCSI target mode. Referring to FIG. 4, in a start up block 402, parameters are read from a configuration file, the serial port is opened and the communications (CFA) interface is opened.

In block 404, a password can optionally be read from a flash memory of the user interface as a verification procedure using, for example, the process of FIG. 8G. If password agreement is recognized in block 406 upon entry via the user interface, operation can proceed to initialization in block 408. Otherwise, use of the computing system 1 is precluded as represented by the "stop USSD" block 410.

In block 408, initialization can include, for example, testing of memory, opening of interfaces such as ATA and APM interfaces. Management port setup can be performed and a partition in the hard disk drive 10 associated with previous contents of the computing system 1 operation can be found to restore contents of the semiconductor memory.

In block 412, the target mode interface can be set up so that the computing system 1 can be operated in a SCSI target mode.

In block 414, a command descriptor block (CDB) can be obtained using a "get" command. One or more CDB commands can be received from one or more host computers (e.g., host computer 2) and buffered in a queue. A given SCSI command can be processed, or executed in block 416. In block 418, a keyboard command can be processed, or executed. The process of blocks 414, 416 and 418 can be repeated with respect to each command descriptor block in the queue.

Thus, FIG. 4 illustrates an exemplary initialization and operation of a computing system operating in a target mode over a SCSI bus, such as the SCSI bus 7 of FIG. 1. To provide the functionality of FIG. 4, SCSI commands are accessed from a queue and processed using the target interface module 346 for communications of processor 3 with the programmable SCSI control unit 11.

(TI1010 Module) Target Interface Module

The target interface module is used as interface software for the programmable SCSI control unit 11 to operate in a SCSI "target" mode so that the host computer 2 can read from and write to the PCI-based semiconductor memory 5 over the SCSI bus 7. In target operation, the SCSI control unit 11 responds to SCSI commands from the host, with the host acting as the initiator.

Figures 5A, 5B:
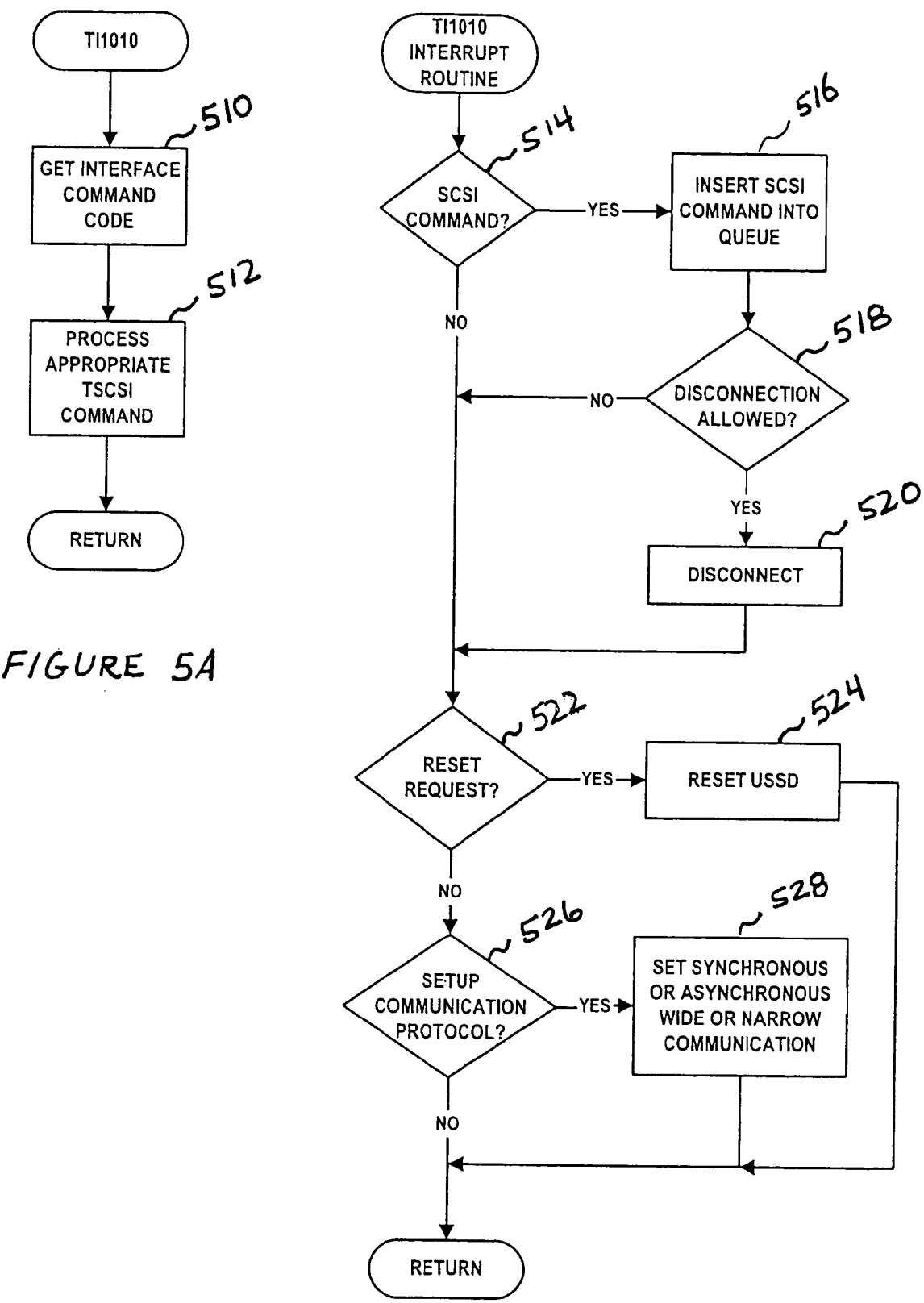
FIGS. 5A-5B illustrate functionality illustrated with the exemplary target interface module of FIG. 3C.

The target interface module allows the processor 3 to perform the functionality generally depicted in FIGS. 5A-5B. FIG. 5A illustrates the basic target interface operation. In block 510, a target interface command code is obtained using a "get" command. In block 512, the appropriate target SCSI (TSCSI) command is processed, or executed by processor 3, according to the interface command code obtained.

FIG. 5B illustrates an exemplary target interface interrupt routine by which the SCSI control unit can interrupt processor 3 to execute a SCSI command. A command received via the SCSI bus 7 is examined to determine whether it constitutes an SCSI command as represented in decision block 514. If so, the command is inserted into the queue in block 516. Decision block 518 determines whether disconnection is allowed (i.e., to discontinue operation in a target SCSI mode), and if so, a disconnect occurs in block 520. Operation proceeds from the "NO" outputs of decision blocks 514 and 518 to a decision block 522, which determines whether a reset request has been made. If so, reset occurs in block 524. Otherwise, a determination is made in decision block 526 as to whether a setup communication protocol request has been made. If so, a synchronous or asynchronous wide or narrow communication is set in block 528. Operation ultimately proceeds to a return block.

Thus, the basic structure of target operation is as follows:

1. The SCSI control unit 11 script issues a wait select instruction. During this phase, the target responds to initiator selection by host computer 2.

2. If the SCSI control unit is selected, then the SCSI bus goes into message out phase, and the target may receive message from the initiator.

3. The SCSI control unit script issues a move instruction, so that the target may receive commands in the format of command descriptor block (CDB).

4. If the target operation has been allowed, then the target may disconnect from the bus at this moment. Later the target may reselect the initiator.

5. The SCSI control unit script issues a move instruction. During this phase (data in or data out), the target may send data to the initiator or receive data from the initiator. It depends on the information transferred during the command phase.

6. The target sends status (status phase) information to the initiator about the previously executed CDB.

7. The target sends messages (message in phase) to the initiator about other the information and the previously sent initiator messages.

8. The target disconnects from the SCSI bus.

The target interface module can insulate the solid state disk (SSD) program from hardware-specific details, and allow the same SSD application to run with different implementations of a target mode interface. Thus, if another SCSI control unit is substituted for the control unit 11, only the target module of the processor 3 needs to be reprogrammed. The module can have a single entry point, which takes a pointer to structure that contains all the information to execute a given command.

In an exemplary embodiment, the TI module supports the following commands:

```
#define TSCSI_CMD_Open 1 /* initialization TSCSI interface */
#define TSCSI_CMD_GetCDB 2 /* get CDB from host */
#define TSCSI_CMD_GetMsg 3 /* get message from
host (msgout) */
#define TSCSI_CMD_SendMsg 4 /* send message to
host (msgin) */
#define TSCSI_CMD_MoveOut 5 /* read from host (dataout) */
#define TSCSI_CMD_MoveIn 6 /* write to host (datain) */
#define TSCSI_CMD_SendSta 7 /* send status */
#define TSCSI_CMD_Reselect 8 /* reselect host */
#define TSCSI_CMD_Close 9 /* deactivation TSCSI */
#define TSCSI_CMD_MoveMem 10 /* memory move */
#define TSCSI_CMD_Reset 11 /* reset TSCSI */
#define TSCSI_CMD_StopScript 12 /* abort scripts execution */
#define TSCSI_CMD_StartScript 13 /* restart scripts execution */
#define TSCSI_CMD_Finish 14 /* finish scsi sequence */
```

The target module can return the following exemplary return codes:

```
#define TSCSI_RC_OK 0 /* command was executed
successfully */
#define TSCSI_RC_InvalidCmd 1 /* invalid command */
#define TSCSI_RC_Timeout 2 /* timeout */
#define TSCSI_RC_Error 3 /* some error */
#define TSCSI_RC_PCI_Error 4 /* PCI error */
#define TSCSI_RC_ITAB_Error 5 /* indirect table error */
#define TSCSI_RC_SCRIPT_Err 6 /* script error */
#define TSCSI_RC_IRQ_Err 7 /* IRQ error */
#define TSCSI_RC_Invalid_CDB 8 /* invalid command
descriptor block */
#define TSCSI_RC_HBA_Q_Full 9 /* queue is full */
#define TSCSI_RC_NOFIND 10 /* no find */
```

The definitions for the indirect table.

```
struct indirect_table {
    quad count;
    quad address;
};
typedef struct indirect_table itable;
```

The following structure can be used for saving communications parameters.

Each host has own entry.

```
struct HBA_ComPar { /* communication parameter's */
byte ID; /* SCSI ID of initiator - Host */
byte scntl3; /* register SCNTL3 */
byte scntl4; /* register SCNTL4 */
byte sxfer; /* register SXFER - offset */
byte Wide; /* 1= wide, 0=narrow */
};
The following flags can be defined for the command
descriptor block (CDB).
#define CDB_Flag_DevReset 1 /* device reset */
#define CDB_Flag_HostMsgWaiting 2 /* host flag msgout */
#define CDB_Flag_SaveDataPoint 4 /* save pointer msg */
#define CDB_Flag_Link 8 /* link CDB */
#define CDB_Flag_Connect 16 /* connect/disconnect */
#define CDB_Flag_Valid 32 /* entry is valid */
#define HBA_Q_max 256 /* maximum number of elements */
```

The following structure is specified for one entry in the CDB queue.

```
struct HBA_Q_CDB { /* CDB Queue */
byte Identify; /* Identify message */
byte Flag; /* Flag CDB */
byte HostID; /* Host SCSI ID */
byte Len; /* length of valid CDB */
byte CDB[16]; /* CDB */
};
```

The following structure is used as interface parameter for the module.

```
struct TSCSI_HBA {
byte HBA_Num; /* HBA Number */
byte HBA_Bus; /* HBA PCI Adapter Bus */
byte HBA_Dev; /* HBA PCI Device */
byte HBA_Fun; /* HBA PCI Function - index */
byte HBA_ID; /* HBA SCSI ID */
byte HBA_LUN; /* HBA SCSI LUN */
quad HBA_RAM; /* HBA PCI Address of RAM for SCRIPT */
quad HBA_ROM; /* HBA PCI Adapter BIOS ROM */
quad HBA_MEM; /* HBA PCI Memory Address */
word HBA_IO; /* HBA PCI Adapter I/O Port Address */
byte HBA_IRQ; /* HBA IRQ */
byte old_irq_mask; /* old interrupt mask */
void (interrupt far *old_irq_handler)(void);
/* old interrupt handler */
byte Cmd; /* TSCSI requested command */
word RC_Code; /* TSCSI returned error code */
word Flag; /* TSCSI flag indicator */
byte HostID; /* initiator SCSI ID */
dquad Addr; /* absolute data address 64bit */
dquad Addr_Src; /* second absolute data address 64bit source */
byte far *Data; /* far pointer for data */
quad Len; /* data length */
struct HBA_ComPar ComPar[16]; /* communications
parameters */
struct HBA_Q_CDB Q_CDB[HBA_Q_max];
/* command queue */
byte CDB[16]; /* current CDB */
/* BUFFERS */
byte msgin[10]; /* buffer for msg in */
byte msgout[10]; /* buffer for msg out */
byte synch_msgout[5]; /* buffer for msg out */
byte wide_msgout[4]; /* buffer for msg out */
byte para_msgout[8]; /* buffer for msg out */
byte stat; /* buffer for status */
byte SenseKey; /* sense key code */
quad DSA; /* DSA register 20bit real address */
quad script_address; /* script address */
```

-continued

```
    quad far *script; /* far pointer to script */
    /* ENTRY POINTS IN SCRIPT */
    quad copy_data; /* entry point for copy data in script */
    quad wait_select; /* entry point for wait select */
    quad finish; /* entry point for finish and diskonnect */
    quad diskonnect; /* entry point for diskonnect */
    quad message_negotiation; /* entry point for
    message negotiation */
    quad msg_out_phase; /* entry point for message out */
    quad msg_in_phase; /* entry point for message in */
    quad status_phase; /* entry point for status */
    quad reselect; /* entry point for reselect */
    quad movein; /* entry point for movein */
    quad moveout; /* entry point for moveout */
    /* FLAG */
    byte interrupt_done; /* flag interrupt done */
    /* INDIRECT TABLE */
    itable far *pind_table; /* pointer to indirect table */
    };
```

A list of routines which can be included in the TI module is as follows:
int tscsi_open(struct TSCSI_HBA *t);

The function opens the target SCSI interface for the host adapter at address BUS:DEV:FUN.

Entry parameters are:
bus, dev, fun, SCSI-ID and LUN
int tscsi_close(struct TSCSI_HBA *t);

The function closes the target SCSI interface for the host adapter at address BUS:DEV:FUN.

Entry parameters are:
bus, dev and fun
int tscsi_getCDB(struct TSCSI_HBA *t);

The function gets CDB from the queue.

Entry parameters are:
*Data—address of a data buffer
Len—required length of data
int tscsi_getmsg(struct TSCSI_HBA *t);

The function gets message from initiator.

Entry parameters:
*Data—address of a data buffer
int tscsi_sendmsg(struct TSCSI_HBA *t);

The function sends message to initiator.

Entry parameters:
*Data—address of a data buffer
Len—required length of data
int tscsi_sendsta(struct TSCSI_HBA *t);

The function sends status to initiator.

Entry parameters:
*Data—address of a data buffer
Len—required length of data
int tscsi_moveout(struct TSCSI_HBA *t);

The function moves data from initiator to target (move data-out).

Entry parameters:
Addr—64 bit destination address
Len—32 bit length
int tscsi_movein(struct TSCSI_HBA *t);

The function moves data from target to initiator (move data-in).

Entry parameters:
Addr—64 bit destination address
Len—32 bit length of data
int tscsi_reselect(struct TSCSI_HBA *t);

The function reselects the initiator.

Entry parameter is:
SCSI ID—id of the host controller
int tscsi_movemem(struct TSCSI_HBA *t);

The function moves memory from 32 bit address to another 32 bit address.

Entry parameters
Addr[0]—32 bit address of destination
Addr_Src[0]—32 bit address of source
Len—data length
int tscsi_start_script(struct TSCSI_HBA *t);

The function starts the script program.
int tscsi$_{13}$ stop_script(struct TSCSI_HBA *t);
22 USSD Software Documentation TI1010 MODULE The function aborts the script execution.
static void far interrupt TSCSI_IRQ_Routine(void);

It is the interrupt handler.

Synchronous Negotiation

Multiple routines can be included in the TI module 346 for negotiation of transfer parameters.

For target operation, negotiating occurs when a negotiation message is received from the initiator (e.g., host computer 2) during a message in phase. Once the synchronous parameters for particular initiator have been established, they can be saved for each the initiator in table HBA_ComPar. These parameters are used for later reconnects to the same initiator. The target issues "reselect from" command, because uses table indirect addressing. The registers SXFER, SCNTL3, SCNTL4 and SCID are loaded from the table entry. These registers can be reloaded from memory before the target moves to the data transfer phase.

The Data-in and Data-out phases can be single transition (ST) or double transition (DT). The controller implements DT clocking to provide speeds of, for example, 80 megatransfers/s (it means for wide transfers 160 MB/s). DT clocking means that the data is sampled on both the asserting and deasserting edge of REQ/ACK. This DT clocking is valid using LVD SCSI bus only.

The following definition determines the maximum synchronous offset used by the controller function when transferring synchronous SCSI data. This determines a method of transfer for ST/DT Data-in and Data-out phases with all other information transfers occurring asynchronously.

```
#define max_offset_ST 31 /* maximum supported offset for ST
transfers */
#define max_offset_DT 62 /* maximum supported offset for DT
transfers */
```

The synchronous period is clock period in ns. The register SCNTL4 contains extra clocks for synchronous transfers. The clock divider contains a factor by which the frequency of SCLK is divided before being presented to the synchronous controller logic. The synchronous transfer speed is determined by the combination of divided clock and the setting of SCNTL4 register. The synchronous answer contains an answer of the target during negotiation.

This function executes negotiation for the synchronous transfers.
void Setup_Wide(struct TSCSI_HBA *t);

This function executes negotiation for the wide transfers.
void Setup_Parallel(struct TSCSI_HBA *t);

This function executes negotiation for the synchronous and wide transfers

This is a list of the important routines used in this module:
int tscsi_open_IRQ(struct TSCSI_HBA *t);

The function set up the new interrupt handler for the SCSI control unit 11.
int tscsi_close_IRQ(struct TSCSI_HBA *t);

The function deactivates the interrupt handler for the SCSI control unit and restores the original interrupt routine.
int tscsi_clear_pending_interrupt(struct TSCSI_HBA *t);

This function clears all pending interrupts in the SCSI control unit 11.
int tscsi_open_script(struct TSCSI_HBA *t);

This function aligns script in the host memory, prepares for using of the command memory move.
int tscsi_copy_script(struct TSCSI_HBA *t);

This function copies script instruction from the host memory to the control unit 11 script RAM, calculates new addresses of entry points.
int tscsi_open_chip(struct TSCSI_HBA *t);

This function sets up the controller registers.
int tscsi_open_ind_table(struct TSCSI_HBA *t);

This function allocates memory for the indirect table and prepares table for use.
int tscsi_open_pci(struct TSCSI_HBA *t);

This function finds the host PCI controller and gets important information.

This is a list of the auxiliary routines used in this module:
quad PA(void far * addr);

This function calculates 20-bit real address from the FAR pointer.
void * align_alloc(size_t size);

This function allocates memory of specified size and aligns its on a 32-bit boundary.
int CDB_Q_Insert(struct HBA_Q_CDB *q,byte *cdb,byte Id,byte Fl,byte Host);

This function inserts CDB into the queue of CDB's.
word CDB_Q_Find(struct HBA_Q_CDB *q);

This function finds the CDB in queue. The CDB with Flag_Connect has highest priority.
int Device_Reset(struct TSCSI_HBA *t);

This function executes the target reset, performs the controller chip initialization and refreshes the chip registers.
void SCSI_Diskonnect(struct TSCSI_HBA *t);

This function sends message to the initiator and disconnects from the bus.
void SCSI_Finish(struct TSCSI_HBA *t,byte Sta, byte Mes);

This function sends status and message to the initiator and disconnects from the bus.

Script Program Module

Referring to FIGS. 6A-6M, the script program module contains scripts used to program scripts processor of the programmable SCSI control unit 11. Scripts are used by the target interface module 346 to, for example, initialize the solid state disk for use as a target device on a SCSI bus.

Referring to FIG. 6A, a PCI bus interface is opened in block 602, followed by opening of a script indirect table 604. The SCSI controller is opened in block 606 followed by initialization of the script program in block 608 and set up of the interrupt request routine in block 610. In block 612, a script program can be copied into the RAM memory, followed by starting of the script program.

In FIG. 6B, the closing of a computing device as a target SCSI device is performed by discontinuing the script program in block 616 and deactivation of the interrupt request routine in block 618. The interrupt request routine is set up in block 610 and deactivated in block 618 can, for example, be the interrupt routine of FIG. 5B.

FIG. 6C illustrates an exemplary accessing of a command block received, for example, from one or more postcomputing systems and buffered in a queue of the PCI adapter 4. This operation is represented in block 620 of FIG. 6C.

FIG. 6D illustrates exemplary steps of a computing device operated in a SCSI mode for getting or sending messages. In blocks 622, a message input/output buffer is set up. Messages can be obtained from or sent to an initiator in block 624.

FIG. 6E illustrates a reselection operation of a computing device in a target SCSI mode, whereby a target such as computing system 1 can reselect a host computer 2. In block 626, an initiator identifier (ID) is obtained. Communication parameters are stored in block 628 for operation of a computing device in the SCSI target mode, followed by a reselection of the initiator in block 630.

Figure 6F:
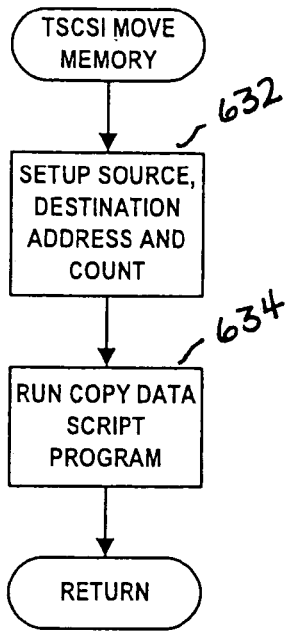

FIG. 6F illustrates a script for moving data in memory, such as from a nonvolatile memory like disk 10 to a RAM of the computing system 1. The FIG. 6F script includes a block 632 wherein source, destination address and count are set up. In block 634, data is copied into the destination address.

Figure 6G:
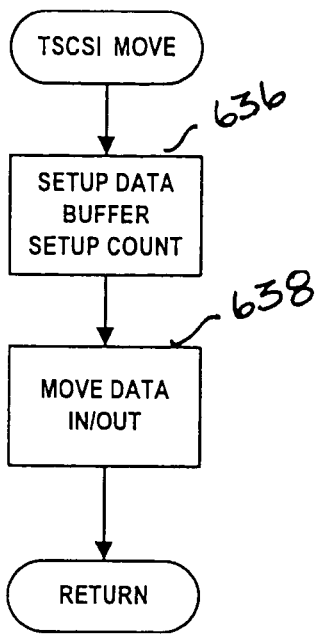

FIG. 6G illustrates a script for moving data from, for example, host computer 2 into a RAM of the computing system 1, and includes a block 636 wherein a data buffer is set up along with a count. In block 638, data is moved into or out of the appropriate memory location.

Figure 6H:
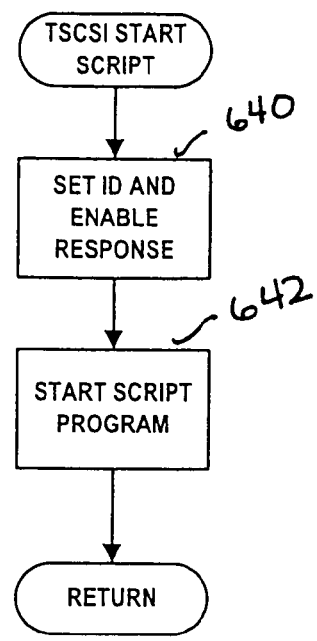

In FIG. 6H, the start of a script program is performed. In blocks 640, an ID is set and a response enabled. The script program is then started in block 642.

Figure 6I:
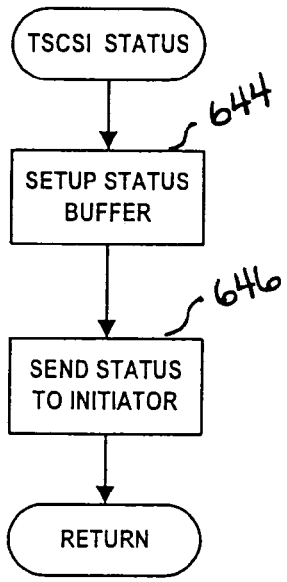
Figure 6J:
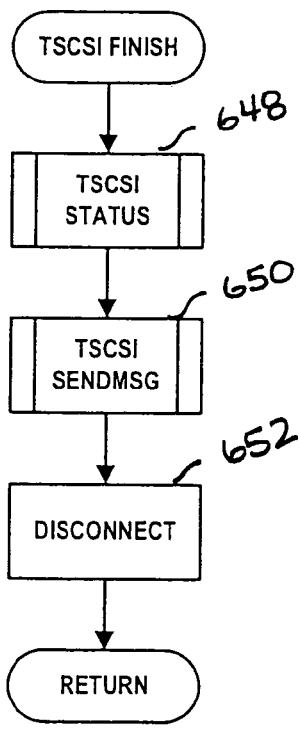

In FIG. 6I, status buffers are set up via a setup block 644. In block 646, the status is sent to an initiator.

The completion of operation of the computing system 1 in a target SCSI mode is performed by monitoring status in block 648 using the FIG. 6I process. A message is then sent in block 650 using the FIG. 5D process followed by a disconnect of the target SCSI mode in block 652.

Figure 6K:
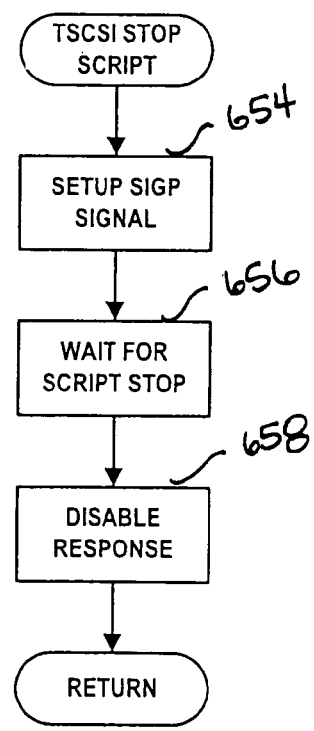

To stop the running of a script, FIG. 6K illustrates initiation of a stop signal in block 654. In block 656, the system waits for the script to stop followed by disabling of a response in block 658.

Figure 6L:
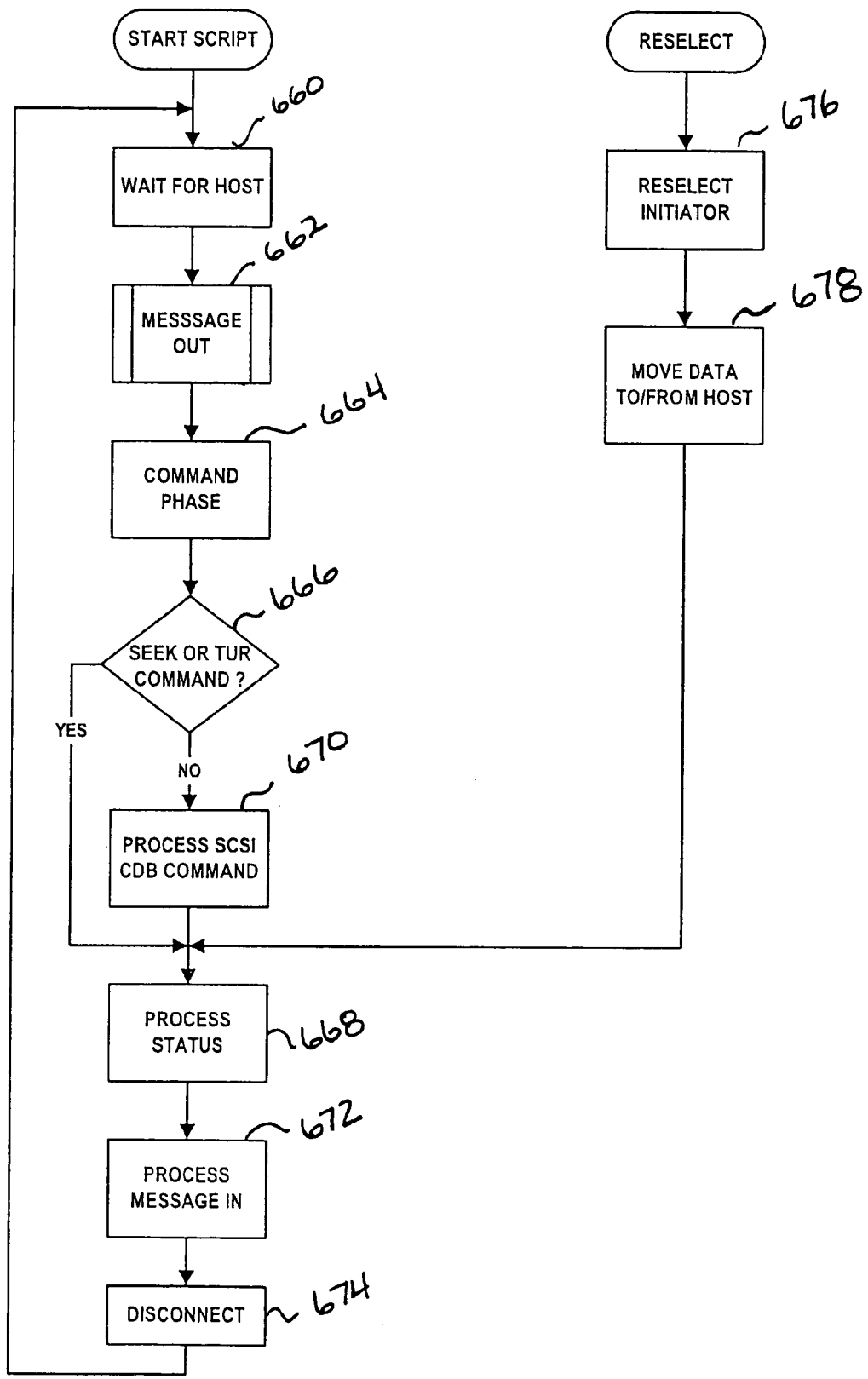
Figure 6M:
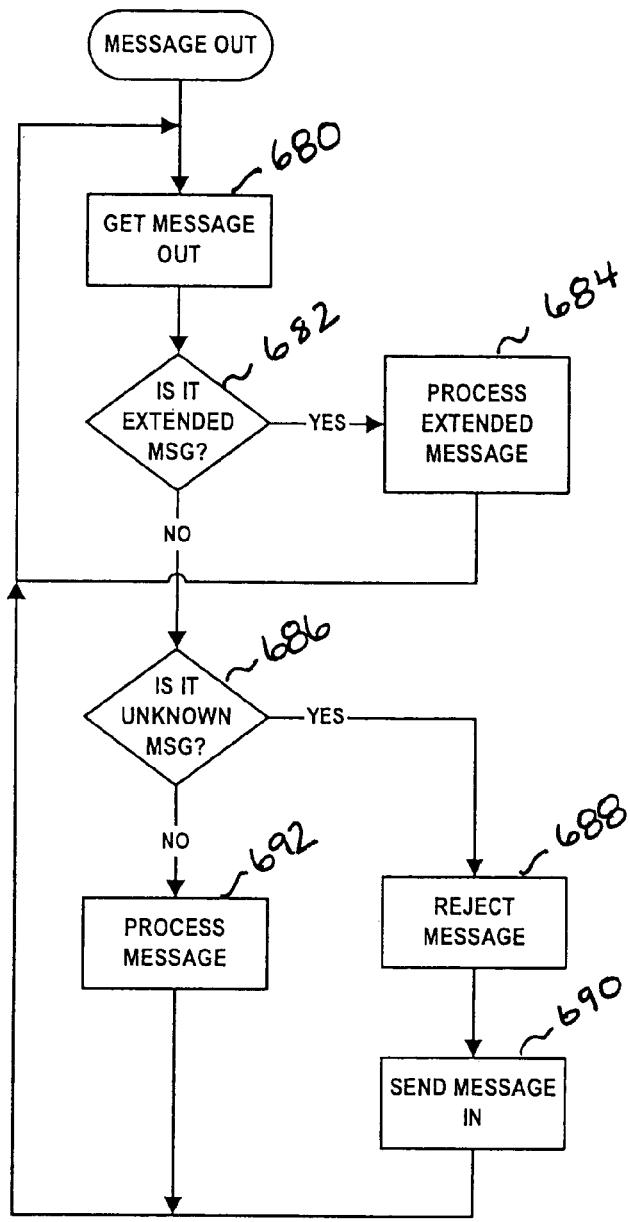

FIG. 6L shows a general flow diagram associated with the start of a script program. In block 660, the system waits to be selected from an initiator, such as the host computing system 2 of FIG. 1. In block 662, a routine of FIG. 6M is called to manage a message out from the host, followed by a command phase 664. In the command phase 664, a SCSI command data block is obtained from the host.

In decision block 666, a decision is made as to whether the command is a non-SCSI command (e.g., one of a seek command or a TUR command). If so, operation proceeds to block 668, wherein status is sent to the initiator (i.e., host computing system 2). However, if the command is a CDB command, operation proceeds to process the SCSI command data block command in block 670, wherein a target module is called for execution of the command data block. Operation then proceeds to the "process status" block 668, followed by a sending of a status message to the initiator (i.e., host computer) in process block 672. A SCSI command data block acquired in the disconnect block 674 ends a target SCSI mode, and operation returns to wait for a subsequent command from the host in block 660.

In a reselection operation, computing system 1 reselects a host computer 2 for data transfer. A reselect initiator is detected in block 676. In block 678, data is moved to or from the host following the reselection.

FIG. 6M illustrates a message out operation. In block 680, a message data is read from an initiator such as the host computer. Decision block 682 determines whether a message is extended and, if so, the extended message is processed in block 684 by calling a target module for set up of a communication protocol. Otherwise, operation proceeds to decision block 686 to determine whether a message is unknown. If so, the message is rejected in block 688 and a message indicating this is forwarded to the initiator in block 690. Otherwise, the message is processed in block 692.

Thus, in an exemplary embodiment, the SCSI control unit 11 can be controlled by an integrated scripts processor through a high level logical interface. SCSI functions can be programmed with the scripts, such as those illustrated in FIGS. 6A-6M. Commands controlling the SCSI functions are fetched out of the main host memory or local memory. These commands instruct the SCSI functions to Select, Reselect, Disconnect, Transfer information, Change Bus Phases, and implement all other aspects of the SCSI protocol. The scripts processor can be a special high speed processor optimized for SCSI protocol.

The SCSI scripts processor allows fetches of both DMA and SCSI commands from host memory or internal scripts RAM. Programs written in SCRIPTS control the actions of the SCSI and DMA cores. The scripts processor can run off the PCI clock and execute complex SCSI bus sequences independently of the host CPU.

Where the SCSI control unit 11 is an LSI53C1010, 8 kbytes of internal RAM are provided for each SCSI channel. The RAM is designed for scripts program, but is not limited to this type of information. When the chip fetches scripts instructions or table indirect information from the internal RAM, these fetches remain internal and do not use the PCI bus. PCI system BIOS can relocate the RAM anywhere in address space. Base Address 3 (BAR3) in the PCI configuration space contains the base address of the internal RAM.

The PCI interface for the LSI53C1010 provides 64-bit address and data capability in the initiator as well as in the target mode.

To operate in the scripts mode, the SCSI control unit 11 uses a scripts start address at a double word boundary. This aligns all the following instructions where all scripts instructions are 8 or 12 bytes long. Instructions are performed until an interrupt instruction is encountered or until an unexpected event causes an interrupt.

The script registers DSP (DMA Script Pointer) contains the address of the next scripts instruction to be fetched; placing an address in this register starts scripts execution.

DSA (Data Structure Address) contains base address used for all table indirect calculations The script and driver program can use an indirect addressing feature. The starting location for the buffer is defined by the data structure address written to the DSA register. The expression specifies the offset into buffer and is added to the starting address of the buffer (DSA) to from absolute address. This method allows the driver program to dynamically specify different parameters for MOVE, SELECT, RESELECT instructions. No storage is allocated.

The script program contains entry points to inform the driver program of starting location of callable routines from the driver program. The driver program must recalculate the addresses of entry points according to starting address of the script RAM.

The script program contains the declaration of variables that are accessible from the driver program. The driver can use to patch these variables. The following are used for the move from memory to memory with possibility changes source and destination address and also number of bytes (count).

EXTERN count
EXTERN source_address
EXTERN destination_address

Absolute keyword defines the symbol name by assigning it a numeric value. The following are definitions for the interrupt codes used for interrupt script instruction (INT). This instruction generates interrupt and halt script.

---

ABSOLUTE SC_int_moveout = 0 ABSOLUTE SC_int_movein = 1
ABSOLUTE SC_int_reset = 2
ABSOLUTE SC_int_request_sense = 3
ABSOLUTE SC_int_inquiry = 4
ABSOLUTE SC_int_read_capacity = 5
ABSOLUTE SC_int_start_stop = 6
ABSOLUTE SC_int_format_unit = 7
ABSOLUTE SC_int_send_diagnostic = 8
ABSOLUTE SC_int_read_buffer = 9
ABSOLUTE SC_int_write_buffer = 10
ABSOLUTE SC_int_synch_ssd = 11
ABSOLUTE SC_int_request_test = 12
ABSOLUTE SC_int_command_aborted = 13
ABSOLUTE SC_int_cdb = 14
ABSOLUTE SC_int_read = 15
ABSOLUTE SC_int_write = 16
ABSOLUTE SC_int_set_up_synch_neg = 20
ABSOLUTE SC_int_set_up_wide_neg = 21
ABSOLUTE SC_int_set_up_para_neg = 22
ABSOLUTE SC_int_non_handled_msg = 23

```
ABSOLUTE SC_int_bad_extended_msg = 24
ABSOLUTE SC_int_message_sent = 25 ABSOLUTE
SC_int_message_get = 26
ABSOLUTE SC_int_status_sent = 27
ABSOLUTE SC_int_reselect = 28
ABSOLUTE SC_int_got_SIGP = 30
ABSOLUTE SC_int_done_with_copy = 99
```
The following are absolute definitions used in script program.
```
;/************************************************************/
;/* S C S I  M E S S A G E S */
;/************************************************************/
/ ABSOLUTE SCSI_Mes_CC = 0x00 ;/* In command complete */
ABSOLUTE SCSI_Mes_Ext = 0x01 ;/* In/Out extended message */
ABSOLUTE SCSI_Mes_SPo = 0x02 ;/* In save data pointers
*/ ABSOLUTE SCSI_Mes_RPo = 0x03 ;/* In restore data pointers
*/ ABSOLUTE SCSI_Mes_Dis = 0x04 ;/* In/Out diskonnect */
ABSOLUTE SCSI_Mes_IDE = 0x05 ;/* Out initiator
detected error */ ABSOLUTE SCSI_Mes_Abo = 0x06 ;/* Out abort */
ABSOLUTE SCSI_Mes_MRj = 0x07 ;/* In/Out message
reject */ ABSOLUTE SCSI_Mes_Nop = 0x08 ;/* Out no operation */
ABSOLUTE SCSI_Mes_PEr = 0x09 ;/* Out message parity
error */ ABSOLUTE SCSI_Mes_LCC = 0x0a ;/* In linked command
complete
*/ ABSOLUTE SCSI_Mes_LCCf = 0x0b ;/* In li. com. comp.(with
flag)*/ ABSOLUTE SCSI_Mes_BDR = 0x0c ;/* Out bus device reset */
ABSOLUTE SCSI_Mes_ATa = 0x0d ;/* Out abort tag */
ABSOLUTE SCSI_Mes_CQu = 0x0e ;/* Out clear queue
*/ ABSOLUTE SCSI_Mes_IRe = 0x0f ;/* Out initiate
recovery */ ABSOLUTE SCSI_Mes_RRe = 0x10 ;/* Out release recovery
*/
ABSOLUTE SCSI_Mes_TeP = 0x11 ;/* Out terminate process */
ABSOLUTE SCSI_Mes_CoT = 0x12 ;/* Out continue task */
ABSOLUTE SCSI_Mes_TTD = 0x13 ;/* Out target transfer
disable */ ABSOLUTE SCSI_Mes_BDRo = 0x14 ;/* Out bus dev. reset
other
port*/ ABSOLUTE SCSI_Mes_CAc = 0x16 ;/* Out clear ACA */
ABSOLUTE SCSI_Mes_SQT = 0x20 ;/* In/Out simple queue
tag */ ABSOLUTE SCSI_Mes_HQT = 0x21 ;/* Out head of queue tag */
ABSOLUTE SCSI_Mes_OQT = 0x22 ;/* Out ordered queue tag */
ABSOLUTE SCSI_Mes_IWR = 0x23 ;/* In ignore wide residue
*/ ABSOLUTE SCSI_Mes_AQT = 0x24 ;/* Out ACA queue tag */
ABSOLUTE SCSI_Mes_QAS = 0x55 ;/* In QAS Request */
ABSOLUTE SCSI_Mes_ID = 0x80 ;/* In/Out Identify */
;/************************************************************
/
;/* S C S I  E X T E N D E D  M E S S A G E S */
;/************************************************************
/ ABSOLUTE SCSI_Ext_Mes_MDP = 0x00 ;/* In modify data pointer */
ABSOLUTE SCSI_Ext_Mes_SDT = 0x01 ;/* In/Out synchronous data
transfer
request */ ABSOLUTE SCSI_Ext_Mes_WDT = 0x03 ;/* In/Out wide data
transfer request
*/
ABSOLUTE SCSI_Ext_Mes_PPR = 0x04 ;/* In/Out parallel protocol
request */ ;/************************************************************
/
;/* S C S I  S T A T U S  C O D E S */
;/************************************************************
/ ABSOLUTE SCSI_Sta_Good = 0x00 ;/* good */
ABSOLUTE SCSI_Sta_Chec = 0x02 ;/* check
condition */ ABSOLUTE SCSI_Sta_Cond = 0x04 ;/* condition met */
ABSOLUTE SCSI_Sta_Busy = 0x08 ;/* busy */
ABSOLUTE SCSI_Sta_Int = 0x10 ;/* intermediate
good */ ABSOLUTE SCSI_Sta_IntC = 0x14 ;/* intermediate condition
met */ ABSOLUTE SCSI_Sta_ResC = 0x18 ;/* reservation conflict */
ABSOLUTE SCSI_Sta_ComT = 0x22 ;/* command terminated */
ABSOLUTE SCSI_Sta_QuFu = 0x28 ;/* task set full (queue
full) */ ABSOLUTE SCSI_Sta_ACA = 0x30 ;/* ACA active */
;/************************************************************
/
;/* S C S I  C O M M A N D  C O D E S */
;/************************************************************
/ ABSOLUTE SCSI_Com_TUR = 0x00 ;/* test unit ready */
ABSOLUTE SCSI_Com_ReU = 0x01 ;/* rezero unit */
ABSOLUTE SCSI_Com_RSn = 0x03 ;/* request sense
*/ ABSOLUTE SCSI_Com_FoU = 0x04 ;/* format
unit */ ABSOLUTE SCSI_Com_ReB = 0x07 ;/* reassign blocks
*/ ABSOLUTE SCSI_Com_Rea = 0x08 ;/* read (6) */
ABSOLUTE SCSI_Com_Wri = 0x0A ;/* write (6) */
```

-continued

```
ABSOLUTE SCSI_Com_Sek = 0x0B ;/* seek (6) */
ABSOLUTE SCSI_Com_Inq = 0x12 ;/* inquiry */
ABSOLUTE SCSI_Com_MSe = 0x15 ;/* mode select
(6) */ ABSOLUTE SCSI_Com_Res = 0x16 ;/* reserve (6) */
ABSOLUTE SCSI_Com_Rel = 0x17 ;/* release (6) */
ABSOLUTE SCSI_Com_Cop = 0x18 ;/* copy */
ABSOLUTE SCSI_Com_MSn = 0x1A ;/* mode
sense (6) */ ABSOLUTE SCSI_Com_StS = 0x1B ;/* start/stop */
ABSOLUTE SCSI_Com_RDi = 0x1C ;/* receive
diagnostic results */ ABSOLUTE SCSI_Com_SDi = 0x1D ;/* send
diagnostic */
ABSOLUTE SCSI_Com_PAR = 0x1E ;/* prevent/allow
medium remov.*/ ABSOLUTE SCSI_Com_RCa = 0x25 ;/* read capacity
*/
ABSOLUTE SCSI_Com_Rea2 = 0x28 ;/* read (10) */
ABSOLUTE SCSI_Com_Wri2 = 0x2A ;/* write (10) */
ABSOLUTE SCSI_Com_Sek2 = 0x2B ;/* seek (10) */
ABSOLUTE SCSI_Com_WaV = 0x2E ;/* write and
verify */ ABSOLUTE SCSI_Com_Ver = 0x2F ;/* verify */
ABSOLUTE SCSI_Com_SDH = 0x30 ;/* search
data high */ ABSOLUTE SCSI_Com_SDE = 0x31 ;/* search data equal */
ABSOLUTE SCSI_Com_SDL = 0x32 ;/* search data low */
ABSOLUTE SCSI_Com_SLi = 0x33 ;/* set limits */
ABSOLUTE SCSI_Com_PFe = 0x34 ;/* pre-fetch */
ABSOLUTE SCSI_Com_SyC = 0x35 ;/* synchronize
cache */ ABSOLUTE SCSI_Com_LUC = 0x36 ;/* lock/unlock cache */
ABSOLUTE SCSI_Com_RDD = 0x37 ;/* read defect data */
ABSOLUTE SCSI_Com_Com = 0x39 ;/* compare */
ABSOLUTE SCSI_Com_CVe = 0x3A ;/* copy and
verify */ ABSOLUTE SCSI_Com_WBu = 0x3B ;/* write buffer */
ABSOLUTE SCSI_Com_RBu = 0x3C ;/* read buffer */ ABSOLUTE
SCSI_Com_ReL = 0x3E ;/* read long */
ABSOLUTE SCSI_Com_WrL = 0x3F ;/* write long */
ABSOLUTE SCSI_Com_ChD = 0x40 ;/* change definition
*/ ABSOLUTE SCSI_Com_WrS = 0x41 ;/* write same */
ABSOLUTE SCSI_Com_LSe = 0x4C ;/* log select */
ABSOLUTE SCSI_Com_LSn = 0x4D ;/* log sense */
ABSOLUTE SCSI_Com_MSe2 = 0x55 ;/* mode select (
10) */ ABSOLUTE SCSI_Com_Res2 = 0x56 ;/* reserve (10) */
ABSOLUTE SCSI_Com_Rel2 = 0x57 ;/* release (10) */
ABSOLUTE SCSI_Com_MSn2 = 0x5A ;/* mode sense (10)
*/ ABSOLUTE SCSI_Com_MMe = 0xA5 ;/* move medium */
ABSOLUTE SCSI_Com_RST = 0xB8 ;/* read element
status */
```

Serial Module

FIGS. 7A-7E illustrate functionality associated with the serial module 342 of FIG. 3C, used for serial communications with peripheral devices such as a user keyboard and display. In FIG. 7A, a serial interrupt is generated in block 702. A decision block 704 determines whether a data is to be transmitted and if so, the data is removed from a write buffer (e.g., FIFO) in block 706 followed by a sending of data in block 708. Otherwise, a decision is made in block 710 to determine whether data is to be received and if so, data is read in block 712 and inserted into read buffer (e.g., FIFO in block 714).

FIG. 7B illustrates the functions associated with opening of a serial port. This process is initiated with the set up of serial parameters in block 716 followed by a clearing of the FIFO queues in block 718. A set up interrupt routine is then performed in block 720.

FIG. 7C illustrates the closing of a port using a resume interrupt routine function block 722. FIG. 7D illustrates a reading of serial data by removing a byte from the read FIFO in block 724. FIG. 7E illustrates the writing of serial data. This operation includes a determination in decision block 726 as to whether a write FIFO is empty. If not, data is inserted into the write FIFO in block 728. Otherwise, data is set in block 730. As illustrated in the exemplary FIG. 3C embodiment, serial data communications are performed under the control of communications (CFA) module 340.

Thus, the CFA module is used for communication with the serial port RS-232. The serial module uses low level programming including reading and writing into registers of a universal asynchronous receiver/transmitter (UART) controller.

The addresses of the registers are defined here:

```
#define TXDATA 0 /* transmit data */
#define RXDATA 0 /* receive data */
#define DIVLSB 0 /* baud rate divisor LSB */
#define DIVMSB 1 /* baud rate divisor MSB */
#define INTENABLE 1 /* interrupt enable */
#define INTIDENT 2 /* interrupt identification */
#define FIFOCTL 2 /* FIFO control register */
#define LINECTL 3 /* line control */
#define MODEMCTL 4 /* modem control */
#define LINESTATUS 5 /* line status */
#define MODEMSTATUS 6 /* modem status */
The line status registers values are defined this way:
#define XMIT_DATA_READY 0x20
#define DATA_READY 0x01
#define TRANSMIT_EMPTY 0x02
The modem control registers values:
#define DTR 0x01
#define RTS 0x02
#define OUT2 0x08
The addresses of 8259 Programmable Interrupt Controller:
#define PIC01 0x21
#define PIC00 0x20
```

-continued

```
The end of interrupt command for 8259 PIC is defined thereby:
#define EOI 0x20
The most important data structure in the module is
defined for cyclic first-in
first-out (FIFO) queue. The structure contains the
data buffer for 512 bytes.
struct fifo {
char buf[512]; /* data buffer */
int out; /* pointer for remove */
int in; /* pointer for insert */
};
The interface parameters are defined by following structure:
struct rscom { /* RS Communication Block */
int port; /* I/O port number */
char intr; /* interrupt vector for IRQ */
char maskirq; /* mask for IRQ */
int parity; /* 0 = none, 1 = odd, 2 = even */
int stopbits; /* 1 or 2 */
int wordlen; /* 7 or 8 */
long int baud; /* baud rate */
struct fifo rx; /* queue for received bytes */
struct fifo tx; /* queue for transmitted bytes */
void (interrupt far *oldcomint)(void); /* old interrupt */
};
int fifo_clear(struct fifo *f);
The function clears the queue.
int fifo_insert(struct fifo *f,char d);
The function inserts one byte into the queue.
int fifo_remove(struct fifo *f,char *d);
The function removes one byte from the queue.
int fifo_isempty(struct fifo *f);
The function performs test if the queue is empty.
int rs_open(struct rscom *rs);
The function opens the serial port, it initializes the
controller UART chip and
makes the new interrupt vector.
int rs_close(struct rscom *rs);
The function closes the serial port and restores interrupt vector.
int rs_read(struct rscom *rs, unsigned char *c);
The function reads one byte from the serial port. It removes
one byte from
the FIFO queue in reality. If the byte is not in the queue,
the function does
not wait for the byte.
int rs_readbuf_isempty(struct rscom *rs);
The function tests if the data buffer (receive FIFO) is empty.
int rs_read_wait(struct rscom *rs, unsigned char *c);
The function reads one byte from the serial port. It removes
one byte from
the FIFO queue in reality. If the byte is not in the queue,
the function will wait
```

-continued

```
for the byte.
int rs_write(struct rscom *rs, unsigned char c);
The function will write one byte to the serial port if transmit
FIFO is empty
else inserts one byte into the queue.
int rs_writebuf_isempty(struct rscom *rs);
The function tests if the data buffer (transmit FIFO) is empty.
int rs_write_wait(struct rscom *rs, unsigned char c);
The function will write one byte to the serial port if transmit
FIFO is empty
else inserts one byte into the queue. It will wait for completion.
static void interrupt far newcomint(void);
The new interrupt service routine.
```

CFA Module

FIGS. 8A-8G illustrate functionality of the communications (CFA) module. In FIG. 8A, a CFA interrupt is processed using an initial decision block 802 to determine whether a serial read FIDO is empty. If so, the interrupt is not processed. Otherwise, serial data is read in block 804 until the complete packet has been received and inserted into the queue via decision block 806 and block 808.

FIG. 8B illustrates an opening of a CFA module via the set up of serial port parameters in block 810 followed by a clearing of the packet queue in block 812. Serial port is opened in block 814. To close the CFA module, the serial port is closed in block 816 of FIG. 8C.

To read a CFA packet, the process of FIG. 8D is performed whereby a packet is removed from the queue in block 818. The packet can be checked using, for example, a check recovery code in block 820. Writing of a packet is performed via FIG. 8E by writing to the serial port in block 822, followed by a write calculated CRC in block 824.

In FIG. 8F, a key of the CFA module can be read via a CFA packet in block 826. In block 8G, a CFA flash memory can be read by writing the CFA packet to a read flash memory in block 828. The CFA module is used for communication with the CFA-633 device. The CFA-633 communicates with its host using the RS-232. All communication between the CFA-633 and the host can take place in the form of a simple packet with CRC. The packet format allows for very reliable communications between the CFA and the host.

Packets can have the following structure:

```
<type><data_length><data><CRC>
type is one byte, and identifies the type and function of the packet.
data_length specifies the number of bytes that will follow in the data field.
        The valid range is 0 to 16.
data is data of the packet. Each type of packet will have a specified
        data_length and format for data.
The packet structure is defined:
struct CFA_Packet { unsigned char
type; /* type and function */ unsigned char length; /* length of data 0..16
*/ unsigned char data[16]; /* data max length 16 */
unsigned int crc; /* CRC all bytes except
crc */
};
The packets are stored into queue:
#define CFA_Max_Packet 32 /* maximum packets in queue */
struct CFA_Packet_Queue {
struct CFA_Packet Queue[CFA_Max_Packet];
int in; /* point for insert */
int out; /* point for remove */
};
The communication structure is defined as:
struct CFA_COM {
```

-continued

```
struct rscom rs;
struct CFA_Packet_Queue Q;
};
The return codes from CFA module:
#define CFA_STA_OK 0 /* OK */
#define CFA_STA_QUEUE_FULL 1 /* queue is full */
#define CFA_STA_QUEUE_EMPTY 2 /* queue is empty */
#define CFA_STA_WRONG_INT 3 /* incorrect interrupt number */
#define CFA_STA_CRC_ERROR 4 /* CRC error */
#define CFA_STA_PACKET_LEN_ERROR 5 /* packet length error */
#define CFA_STA_KEY_NOT_PRESS 6 /* key not pressed */
#define CFA_STA_TIMEOUT 7 /* timeout */
This is a list of valid commands supported by the CFA-633 device:
#define CFA_cKey_Activity 0x80
#define CFA_cFan_Speed_Report 0x81
#define CFA_cTemp_Report 0x82
#define CFA_cPing 0x00
#define CFA_cGet_Version 0x01
#define CFA_cWrite_User_Flash 0x02
#define CFA_cRead_User_Flash 0x03
#define CFA_cStore_State 0x04
#define CFA_cReboot 0x05
#define CFA_cClear_LCD 0x06
#define CFA_cSet_Line1 0x07
#define CFA_cSet_Line2 0x08
#define CFA_cSet_Char_Data 0x09
#define CFA_cRead_Mem 0x0a
#define CFA_cSet_Cursor_Pos 0x0b
#define CFA_cSet_Cursor_Style 0x0c
#define CFA_cSet_Contrast 0x0d
#define CFA_cSet_Backlight 0x0e
#define CFA_cFan_Pulse_Count 0x0f
#define CFA_cSet_Fan_Report 0x10
#define CFA_cSet_Fan_Power 0x11
#define CFA_cRead_DOW_Info 0x12
#define CFA_cSet_Temp_Report 0x13
#define CFA_cSet_DOW_Trans 0x14
#define CFA_cSet_Live 0x15
This is a list of routines for manage the queue of packets:
int CFA_Packet_Queue_Clear(struct CFA_Packet_Queue *f);
The function clears the packet queue.
int CFA_Packet_Queue_Insert(struct CFA_Packet_Queue *f,struct
CFA_Packet *p);
The function inserts the packet into queue.
int CFA_Packet_Queue_Remove(struct CFA_Packet_Queue *f,struct
CFA_Packet *p);
The function removes the packet from queue.
int CFA_Packet_Queue_IsEmpty(struct CFA_Packet_Queue *f);
The function tests if queue is empty.
This is a list of routines for manage the packets:
int CFA_Read_Packet (struct CFA_COM *com,struct CFA_Packet
*packet);
int CFA_Read_Packet_Wait (struct CFA_COM *com,struct CFA_Packet
*packet);
int CFA_Write_Packet(struct CFA_COM *com,struct CFA_Packet
*packet);
int CFA_Write_Packet_Wait(struct CFA_COM *com,struct CFA_Packet
*packet);
This is a list of routines for manage reports and commands:
int CFA_Open(struct CFA_COM *com,unsigned int port,unsigned char
irq);
The function opens the CFA interface, initializes the serial port and makes
interrupt services.
int CFA_Close(struct CFA_COM *com);
The function closes the CFA interface.
74 USSD Software Documentation CFA MODULE
int CFA_Ping(struct CFA_COM *com,char *str);
The function performs ping command. The returned packet will be identical
to the packet sent.
int CFA_GetKey(struct CFA_COM *com);
The function gets a key activity report packet. If a key on panel is pressed or
released, the device will send the report packet to the host.
The key activity codes:
#define CFA_cKey_Up_Press 1
#define CFA_cKey_Down_Press 2
#define CFA_cKey_Left_Press 3
#define CFA_cKey_Right_Press 4
#define CFA_cKey_Enter_Press 5
#define CFA_cKey_Exit_Press 6
```

```
#define CFA_cKey_Up_Release 7
#define CFA_cKey_Down_Release 8
#define CFA_cKey_Left_Release 9
#define CFA_cKey_Right_Release 10
#define CFA_cKey_Enter_Release 11
#define CFA_cKey_Exit_Release 12
int CFA_Write_Flash(struct CFA_COM *com,unsigned char *p);
The function writes a data into flash memory. The CFA-633 reserves 16
bytes of non-volatile memory for arbitrary use. This memory could be used to
store any data required. All 16 bytes must be supplied.
int CFA_Read_Flash(struct CFA_COM *com);
The function reads a data from flash memory.
int CFA_Set_Line1(struct CFA_COM *com,unsigned char *p);
The function sets the characters displayed for the top line of LCD screen.
int CFA_Set_Line2(struct CFA_COM *com,unsigned char *p);
The function sets the characters displayed for the bottom line of LCD screen.
int CFA_Clear_LCD(struct CFA_COM *com);
The function sets the contents of the LCD screen to spaces and moves the
cursor to the left-most column of the top line.
int CFA_Store_Current_State(struct CFA_COM *com);
The function stores a current state into flash memory as boot state. The
CFA-633 loads its power-up configuration from flash non-volatile memory
when power is applied. This command can be used to customize welcome screen, as well
as many other parameters of the CFA.
```

PCI Module

Figure 9A:
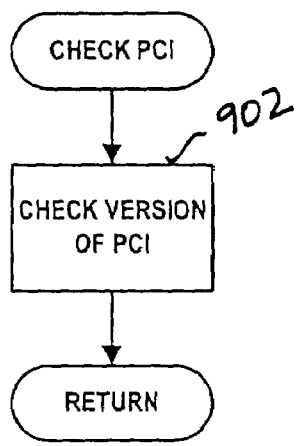
FIGS. 9A-9C illustrate functionality associated with the PCI bus interface module of FIG. 3C.
Figure 9B:
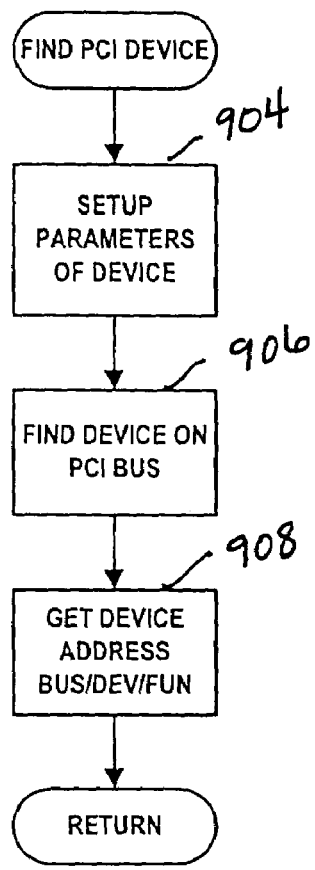
Figure 9C:
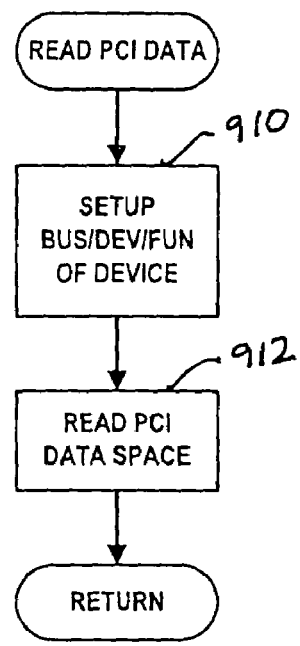

FIGS. 9A-9C show functionality associated with the PCI module used by processor 3 for interfacing the SCSI control unit 11 with the PCI bus. A checking of the PCI is performed in FIG. 9A by checking a version in block 902. To locate a PCI device, the steps of FIG. 9B can be performed. In step 904, a parameter setup occurs. The device is located on the PCI bus in block 906, followed by an acquisition of the device address bus, device and function in block 908. FIG. 9C shows reading of a PCI data using a setup block 910 in a read block 912.

The PCI module is thus used for communication with general PCI services. The module communicates with PCI using BIOS interrupt services The following are the exit status codes returned from the BIOS services:

```
#define PCI_Success 0x00
#define PCI_Fun_Not_Support 0x81
#define PCI_Bad_Vendor 0x83
#define PCI_Device_Not_Found 0x86
#define PCI_Bad_Reg_Number 0x87
#define PCI_Set_Failed 0x88
#define PCI_Buffer_Small 0x89
The following are the data structures:
struct PCI_Info { /* PCI information */
char hw_mech; /* hardware mechanism */
char int_level_major; /* interface level major version */
char int_level_minor; /* interface level minor version */
char last_bus; /* number of last PCI bus */
};
struct PCI_Device { /* device number */
char bus; /* bus number 0-255 */
char dev; /* device number 0-31 */
char fun; /* function number 0-7 */
};
```

The following a source code shows the PCI configuration registers implemented in the SCSI control unit 11. All PCI-compliant devices, support VendorID, DeviceID, Command and Status registers. In the SCSI controller, such as the LSI53C1010, additional registers are supported. Abbreviation RO means Read Only register, RW means Read/Write register.

```
struct PCI_Config_Page { unsigned int VendorID;
/* RO manufacturer of the device */ unsigned int DeviceID; /* RO
identifies device */
unsigned int Command; /* RW device ability to
generate and resp */ unsigned int Status; /* RW status information */
unsigned char Revision; /* RO revision level of
device */ unsigned char ClassCode[3]; /* RO generic function of the
device */ unsigned char CacheLineSize; /* RW in units 32-bit words */
unsigned char LatencyTimer; /* RW in units of PCI bus
clocks */ unsigned char HeaderType; /* RO identifies layout of bytes
0x10-0x3f*/ unsigned char Reserved1; /* reserved */
unsigned long BaseAddress0; /* RW I/O port
address bit 1 reserved */ unsigned long BaseAddress1; /* RW MEM
addr.bit 0 is hardwired to zero
*/ unsigned long BaseAddress2; /* RW base address internal RAM 4KB
*/
unsigned long BaseAddress3;
unsigned long BaseAddress4;
unsigned long BaseAddress5;
unsigned long BaseAddress6;
USSD Software Documentation 87 PART MODULE
unsigned int SubSystVendorID; /* RO vendor */ unsigned int
SubSystID; /* RO vendor */
unsigned long BaseAddressROM; /* RW ROM
address */ unsigned long Reserved2;
unsigned long Reserved3;
unsigned char InterruptLine;
/* RW interrupt line routing info */ unsigned char InterruptPin; /* RO
int.pin that the device uses
01=inta*/ unsigned char Min_Gnt; /* RO latency timer value in 0.25
microsec*/ unsigned char Max_Lat; /* RO latency timer value in 0.25
microsec*/
};
int PCI_Check_Present (struct PCI_Info *info);
The function checks if PCI BIOS is present.
int PCI_Find_Device(int Device,int Vendor,int Index,struct PCI_Device
*Info);
The function finds PCI device by means of device ID,
vendor ID and index.
int PCI_Find_Class(long Class, int Index,struct PCI_Device *Info);
The function finds PCI device by means of class code and index.
int PCI_Read_Byte(struct PCI_Device *Info,int Register,char *Data);
The function reads configuration-register byte from
the page of PCI device.
int PCI_Read_Word(struct PCI_Device *Info,int Register,int *Data);
The function reads configuration-register word
from the page of PCI device.
int PCI_Read_DWord(struct PCI_Device *Info,int Register,long *Data);
```

-continued

The function reads configuration-register double word from the page of PCI device.

Partition (Part) Module

Figure 10A:
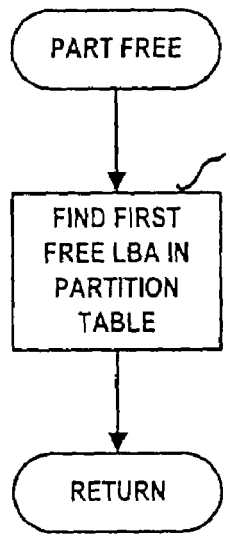
FIGS. 10A-10D illustrate functionality associated with the exemplary memory partition module of FIG. 3C.
Figure 10B:
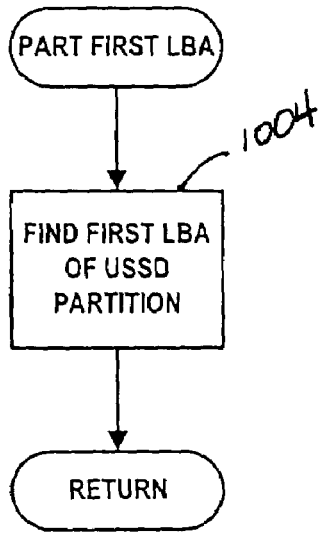
Figure 10C:
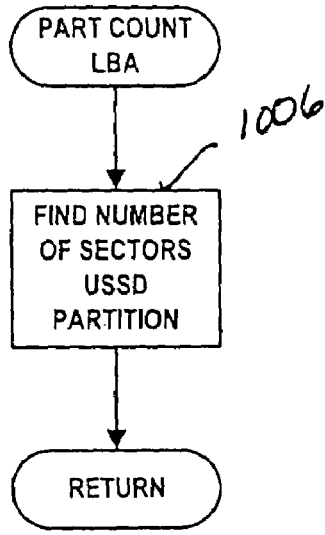
Figure 10D:
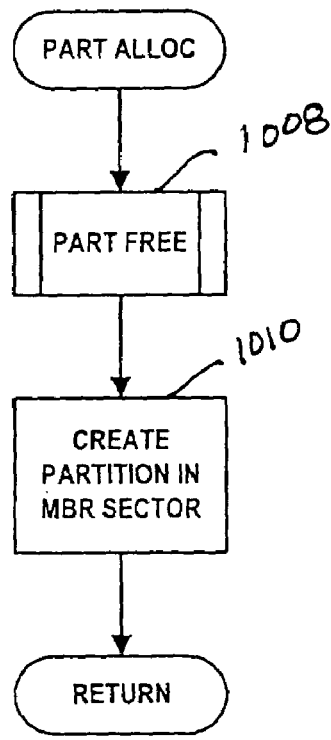

FIGS. 10A-10D illustrate functionality associated with the partition module, for storing contents of the semiconductor memory in, for example, a hand disk 10. FIG. 10A illustrates a part free function, wherein the first free logical block address (LBA) in a partition table is located in block 1002. FIG. 10B illustrates locating first LBA of the solid state disk partition in block 1004. FIG. 10C illustrates locating the number of vectors associated with the solid state disk partition in block 1006. FIG. 10D illustrates an allocation routine whereby a part free operation of FIG. 10A is performed in block 1008, followed by creation of a partition in a master boot record sector via block 1010.

The part module is used for manipulations with the master boot record (MBR).

The following are types codes of the partition table:

```
#define PART_TYPE_Empty 0x00 /* entry not allocated */
#define PART_TYPE_FAT12 0x01 /* DOS FAT12 */
#define PART_TYPE_Xenix 0x02 /* Xenix */
#define PART_TYPE_Xenix2 0x03 /* Xenix */
#define PART_TYPE_FAT16 0x04 /* DOS FAT16 */
#define PART_TYPE_Ext 0x05 /* Extended DOS */
#define PART_TYPE_DOS32M 0x06 /* DOS 4.0 partition
with more than 32MB */
#define PART_TYPE_SSD 0x55 /* SSD partition */
The following structure defines the partition entry:
struct part_entry { /* partition entry */ unsigned char status; /* partition
status */
unsigned char begin_head; /* head where partition
begins */ unsigned int begin_sec_cyl; /* sec. and cyl. where partition
begins */ unsigned char part_type; /* partition type */
unsigned char end_head; /* head where partition
ends */ unsigned int end_sec_cyl; /* sec. and cylinder where
partition ends */ unsigned long first_sector; /* first sector partition */
unsigned long numof_sector; /* number of sectors in
partition */
};
The following structure defines the master boot sector with the partition
table:
struct part_sec { /* master boot sector */ unsigned char
bootcode[0x1be]; /* boot code */
struct part_entry partab[4]; /* partition table */ unsigned int ident; /*
identification
0xaa55 */
};
unsigned long Part_First_Free_LBA(struct part_sec *MBR);
This function finds first free logical block address.
unsigned long Part_Find_First_LBA(struct part_sec *MBR, unsigned
char typ);
This function finds first LBA in required partition type.
unsigned long Part_Find_Count_LBA(struct part_sec *MBR, unsigned
char typ);
This function finds number of sectors in required partition.
int Part_Alloc(struct part_sec *MBR,unsigned char typ,unsigned long
sectors);
This function allocates partition of required size and type.
```

ATA Module

Figure 11A:
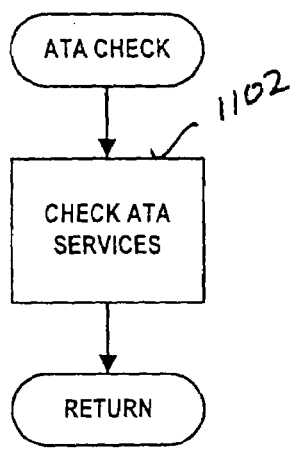
FIGS. 11A-11C illustrate functionality associated with the exemplary ATA module of FIG. 3C used to interface a hard disk drive.
Figure 11B:
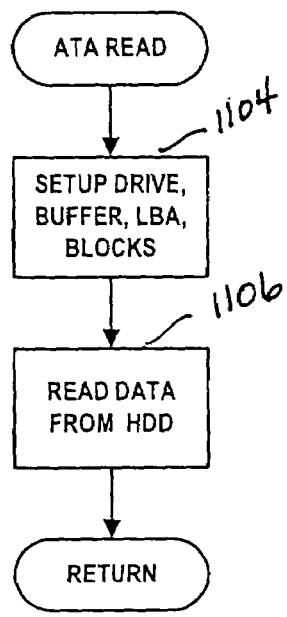
Figure 11C:
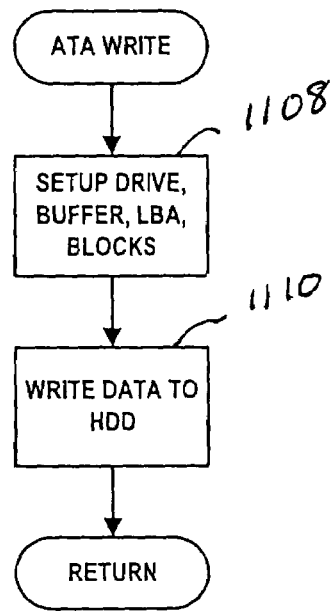

FIGS. 11A-11C illustrate functionality of the ATA module, used for communication with, for example, the hard disk 10. In FIG. 11A, ATA services are checked in block 1102. In FIG. 11B, a read operation is performed using a setup of a drive, buffer and LBA blocks via block 1104, followed by a reading of data from the hard disk drive in block 1106. FIG. 11C illustrates a write operation, which involves setting up the drive, buffer and LBA blocks in block 1108, followed by a writing of data to the hard disk drive in block 1110.

The ATA module is used for communication with extended fixed disk (EFD) services. The module communicates with EFD using BIOS interrupt service.

The data structure used for EFD is a disk address packet. The service converts addressing information in the disk address packet to physical parameters appropriate to the disk media. The following can be the structure for device address packet:

```
struct ATA_Device_Address_Packet { unsigned char size; /*
packet size in bytes - shall be 16 or greater */
char reserved; /* reserved must be 0 */ unsigned char nBlocks; /*
number of blocks to
transfer - maximum 127 */
char reserved2; /* reserved must be 0 */
void far *pbuffer; /* address of buffer 32bit seg:ofs, if set to */
/* ffff:ffff then address is found at offset 10h */ unsigned long LBALo; /*
logical block address */
unsigned long LBAHi;
unsigned long fbufferLo;
/* 64 bit flat address of the transfer buffer */ unsigned long fbufferHi;
};
The functions uses the following parameters:
entry:  Drive - drive number
        buf - buffer address
        LBA - logical block address
        nblk - number of blocks to transfer
exit: return - 0 if all is OK, else error code
int ATA_Check_Present(char Drive);
The function is used to check for presence of int 0x13 extensions. The
function will return 0 if extension is present for specified drive.
int ATA_Read(char Drive,void *buf,unsigned long LBA,unsigned char
nblk);
The function performs extended read, transfers sectors from the device to
memory.
int ATA_Write(char Drive,void *buf,unsigned long LBA,unsigned char
nblk);
The function performs extended write, transfers sectors from
memory to the device.
int ATA_Verify(char Drive,unsigned long LBA,unsigned char nblk);
This function verifies sectors without transferring data between the device
and memory.
int ATA_Seek(char Drive,unsigned long LBA);
This function allows the host to provide advanced notification
that particular data can be requested by the host in a
subsequent command. The function initiates a seek operation.
The seek need not be complete when the function
completes.
int ATA_Get_Drive_Param(char Drive,void *buf);
This function returns physical ATA device parameters. The following
structure describes these parameters.
struct ATA_Device_Parameters { unsigned int size; /*
buffer size min. 30 */ unsigned int flag; /* information flag */
/* bit 0 DMA boundary errors are handled transparently */
/* bit 1 the geometry returned in cyl/hea/sec is valid */
/* bit 2 media is removable */
/* bit 3 device support write verify */
/* bit 4 device has media change notification */
/* bit 5 media is lockable */
/* bit 6 device geometry is set to maximum and */
/* no media is present when this bit is set to one*/
/* bit 7-15 reserved */ unsigned long cyls; /* number of
physical cylinders */ unsigned long heads; /* number of physical heads
*/
unsigned long sects; /* number of physical sectors
per track */ unsigned long tsects[2]; /* number of physical sectors */
unsigned int Isect; /* number of bytes per sector */
unsigned int DPTEoff; /* offset to device parameter
table extension */ unsigned int DPTEseg; /* segment to DPTE */
unsigned int Key; /* key 0xbedd indicates
presence dev. path info*/ unsigned char IDevPath; /* length device path
including key */
unsigned char reserved1;
unsigned int reserved2;
char hostbus[4]; /* host bus type - PCI/ISA */
```

-continued

```
char interface[8]; /* interface type ATA/ATAPI/SCSI/USB/1394 */
unsigned long intpath[2]; /* interface path */
unsigned long devpath[2]; /* device path */
unsigned char reserved3;
unsigned char checksum;
/* 2's complement of sum of offset 30-64 */
/* from Key to reserved3 including */
};
The following structure is device parameter table extension:
struct ATA_DPTE { /* Device Parameter Table Extension */ unsigned int
ioport; /* I/O port base address */
unsigned int cnport; /* control port address */
unsigned char hreg; /* head register upper
nibble */
/* bit 0-3 = 0 */
/* bit 4 ATA DEV bit */
/* bit 5 = 1 */
/* bit 6 LBA enable */
/* bit 7 = 1 */ unsigned char vendorspec; /* BIOS vendor
specific */ unsigned char irq; /* IRQ for this device (bit
0-3) */ unsigned char blockcount; /* block count for read/write multi.
commands */ unsigned char dma; /* bit 0-3 DMA channel */
/* bit 4-7 DMA type */ unsigned char pio; /* bit 0-3 PIO type */
/* bit 4-7 0 */ unsigned int biosflag; /* bit 0 fast
PIO accessing enabled */
98 USSD Software Documentation ATA MODULE
/* bit 1 DMA accessing enabled */
/* bit 2 ATA read/write multiple enable */
/* bit 3 CHS translation enabled */
/* bit 4 LBA translation enabled */
/* bit 5 removable media */
/* bit 6 ATAPI device */
/* bit 7 32-bit transfer mode */
/* bit 8 ATAPI device uses comm. Packet inter. */
/* bit 9-10 translation type */
/* 00 bit shift translation */
/* 01 LBA assisted translation */
/* 10 reserved */
/* 11 vendor specific translation */
/* bit 11 ultra DMA accessing enabled */
/* bit 12-15 reserved shall be 0 */ unsigned int res; /* reserved, shall be
0 */
unsigned char revision; /* revision level of this
table (11h) */ unsigned char checksum; /* 2's complement of 8bit sum
of bytes 0-14
*/
};
int ATA_Set_Config(char Drive,unsigned char Func);
entry:  drive number
        function 0x00 enable prefetch
            0x01 disable prefetch
            0x02 set maximum PIO transfer mode
            0x03 set PIO mode 0
            0x04 return to default PIO transfer mode
            0x05 enable maximum DMA mode
            0x06 disable DMA mode
exit: return=0 OK
This function allows non-hardware-specific software to configure host
adapter and devices for optimal operation.
```

APM Module

Figure 12A:
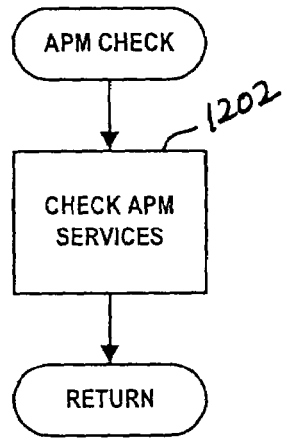
FIGS. 12A-12E illustrate functionality associated with the exemplary APM power management module of FIG. 3C.
Figure 12B:
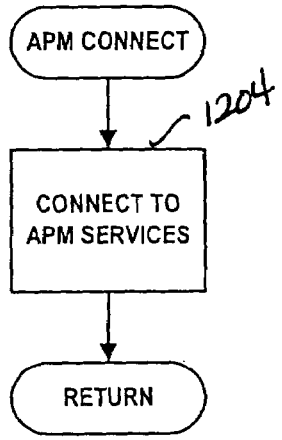
Figure 12C:
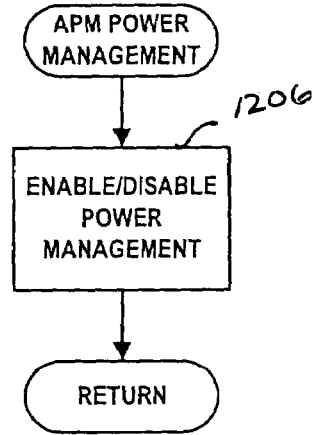
Figure 12D:
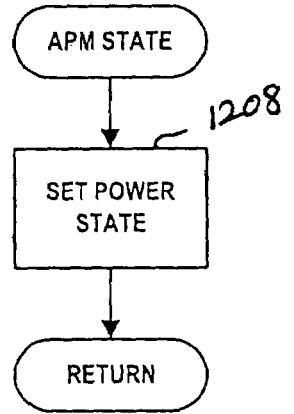
Figure 12E:
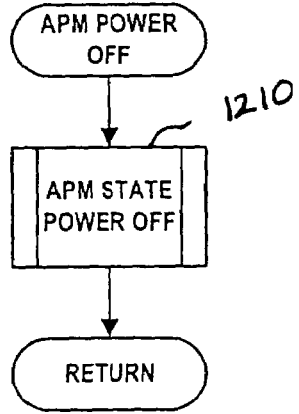

FIGS. 12A-12E illustrate functionality of the advanced power management (APM) module. In FIG. 12A, APM services are checked via block 1202. In FIG. 12B, an APM connect operation is performed via block 1204. APM power management is performed via FIG. 12C using the enable/disable power management block 1206. An APM state can be set via a set power state block 1208 of FIG. 12B. An APM power off operation can be performed by calling an APM state power off routine in block 1210.

The APM module is used for communication with Advanced Power Management services. The module communicates with APM using BIOS interrupt service.

The following are the exit status codes returned from the BIOS services:

```
#define APM_PM_Disabled 0x01
#define APM_RM_Connected 0x02
#define APM_Int_Not_Connected 0x03
#define APM_PM16_Connected 0x05
#define APM_PM16_Not_Support 0x06
#define APM_PM32_Connected 0x07
#define APM_PM32_Not_Support 0x08
#define APM_Device_ID_Invalid 0x09
#define APM_Param_Out_Range 0x0a
#define APM_Int_Not_Engaged 0x0b
#define APM_Unable_Req_State 0x60
#define APM_No_PM_Event 0x80
#define APM_No_APM_Present 0x86
int APM_Check_Present(int *info);
The function tests if APM is supported.
int APM_Int_Connect(void);
The function connects interface.
int APM_Power_Management_Enable(void);
The function enables power management for all PM devices controlled by
the BIOS.
int APM_Power_Management_Disable(void);
The function disables power management for all PM devices controlled by
the BIOS.
int APM_Power_State(int DeviceID, int State);
The function set power state for device ID. The following are the power
device ID codes:
#define APM_Dev_All 0x0001
#define APM_Dev_Display 0x01ff
#define APM_Dev_Sec_Storage 0x02ff
#define APM_Dev_Parallel 0x03ff
#define APM_Dev_Serial 0x04ff
#define APM_Dev_Network 0x05ff
#define APM_Dev_PCMCIA 0x06ff
The following are the power state codes:
#define APM_Sta_APM_Enable 0x0000
#define APM_Sta_Standby 0x0001
#define APM_Sta_Suspend 0x0002
#define APM_Sta_Off 0x0003
#define APM_Sta_Last_Req 0x0004
#define APM_Sta_Last_Req_Rej 0x0005
USSD Software Documentation 103 APM MODULE
int APM_Power_Off(void);
The function performs power off.
int APM_PM_Event(int *Event);
The function gets PM event.
```

Management Module

FIGS. 13A-13B illustrate functionality associated with management module 356 of FIG. 3C. In FIG. 13A, a management interrupt is invoked, after which a routine is called for receiving http data in block 1302. An answer is assembled in block 1304, followed by the calling of a routine in block 1306 to send the http data. FIG. 13B illustrates management setup, whereby a routine is called in block 1308 for initialization of http data. In block 1310, the interrupt routine is activated.

FIG. 13C illustrates the routine for initializing http data and involves TCP/IP initialization in block 1312. FIG. 13D illustrates sending of http data using a setup protocol head 1314. The body of the message setup in block 1316 is followed by sending of the data in block 1318. Receipt of http data is illustrated in FIG. 13E and involves reading of data in block 1320 followed by a decision as to whether a message should be obtained in decision block 1322. If so, parameters are analyzed in block 1324.

Using the management module 356 of FIG. 3C, the PCI bus can be used to access an operating system stored in a memory via a network connection using IP. The PCI bus can be used to access an operating system stored in an external memory such as a compact disk and/or a diskette.

The management module can manage access to the semiconductor memory 5 remotely via the network connection.

The operating system can be encrypted to control access to information stored on the semiconductor memory, and access can be controlled to the operating system via password protection. For example, a password provided within the operating system program can be compared with a password stored within a device, such as a user display device connected to the semiconductor memory 5.

It will be appreciated by those skilled in the art that the present invention can be embodied in other specific forms without departing from the spirit or essential characteristics thereof.

For example, exemplary embodiments can be used in conjunction with Fibre Channel and/or with grid computing via dispersed grids (e.g., World Wide Grid (WWG)), and/or with alternate protocols including, but not limited to iSCSI. The iSCSI protocol can, for example, send packeted SCSI commands via IP. A universal solid state disk device as described herein can be modified to accommodate this by, for example, inclusion of an Ethernet adapter.

The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. An electronic semiconductor disk, comprising:
    a PCI bus; and
    a semiconductor memory connected to the PCI bus;
    an adapter connected with the PCI bus, the adapter interfacing the PCI bus with a SCSI bus interface, wherein the adapter is programmed to receive requests via the SCSI bus interface including disk drive commands to read and write data at specified locations on a disk drive, and to access the semiconductor memory via the PCI bus to read and write the data in the semiconductor memory at memory addresses corresponding to the specified locations in the received disk drive commands.

2. The electronic semiconductor disk according to claim 1, wherein the semiconductor memory is at least one of dynamic memory, synchronous dynamic memory, static memory and flash type memory.

3. The electronic semiconductor disk according to claim 1, comprising:
    a processor having a local bus connected to the semiconductor memory for controlling the adapter.

4. Apparatus according to claim 1, wherein the adapter translates an external memory access request, received from the computing unit as a SCSI bus request, into a PCI bus request for the semiconductor memory.

5. An electronic semiconductor disk, comprising:
    a semiconductor memory;
    a first processor connected by a PCI bus to a PCI adapter, the PCI adapter being a PCI bus controller linked through the PCI bus to the semiconductor memory of the electronic semiconductor disk;
    a local bus for connecting the semiconductor memory to the first processor, wherein the PCI adapter of the electronic semiconductor disk includes:
        a programmable SCSI control unit, connected both to an interface of the PCI bus for communicating with the semiconductor memory, and to an interface of a SCSI bus for communicating with an external computing system using the programmable SCSI control units, wherein the programmable SCSI control unit is programmed to receive requests via the SCSI bus including disk drive commands to read and write data at specified locations on a disk drive, and to access the semiconductor memory via the PCI bus to read and write the data in the semiconductor memory at memory addresses corresponding to the specified locations in the received disk drive commands.

6. An electronic semiconductor disk according to claim 5, wherein the semiconductor memory is a synchronous dynamic random access memory.

7. An electronic semiconductor disk according to claim 5, further comprising a magnetic disk connected to the local bus to backup data stored in the semiconductor memory.

8. An electronic semiconductor disk according to claim 5, wherein the PCI adapter comprises:
    a memory unit for communicating with the semiconductor memory, the memory unit storing an operating system program for the PCI adapter.

9. An electronic semiconductor disk according to claim 8, wherein the memory unit of the PCI adapter is at least one of a programmable EPROM, PEROM, EEPROM and flash EPROM memory.

10. An electronic semiconductor disk according to claim 5, connected by the SCSI bus to an external computing system.

11. Apparatus configured as an electronic semiconductor disk for storing data, comprising:
    a semiconductor memory;
    a PCI bus connected to the semiconductor memory; and
    a PCI bus controller of the PCI bus having a host bus interface, and being configured to operate as a target device of a host computer via the host bus interface, wherein the PCI bus controller receives requests via the host bus interface including disk drive commands to read and write data at specified locations on a disk drive, and accesses the semiconductor memory via the PCI bus to read and write data in the semiconductor memory at memory addresses corresponding to the specified locations in the received disk drive commands.

12. Apparatus according to claim 11, wherein the PCI bus controller comprises a programmable SCSI control unit.

13. Apparatus according to claim 12, wherein the the host bus interface comprises a SCSI bus interface connected with the programmable SCSI control unit; and wherein the PCI controller comprises a PCI bus interface connected with the programmable SCSI control unit.

14. Apparatus according to claim 11, wherein the PCI bus controller includes a local memory for storing an operating system of the PCI bus controller.

15. Apparatus according to claim 14, wherein the local memory is an EEPROM.

16. Apparatus according to claim 11, wherein the semiconductor memory is at least one of dynamic memory, synchronous dynamic memory, static memory and flash memory.

17. Apparatus according to claim 11, wherein the semiconductor memory is at least one of an SRAM, DRAM, SDRAM and DDRAM.

18. Apparatus according to claim 11, comprising:
    a disk memory for storing an operating system of the PCI bus controller.

19. Apparatus according to claim 11, in combination with a host computer and a SCSI bus, wherein the SCSI bus interconnects the host computer and the host bus interface.

20. Apparatus according to claim 19, wherein the host computer includes a SCSI controller, and wherein at least a portion of a program for controlling the SCSI bus via the SCSI controller is supplied from a local memory of the apparatus.

21. Apparatus according to claim 19, wherein the host computer includes a SCSI controller, and wherein at least a portion of a program for controlling the SCSI bus via the SCSI controller is supplied from a disk memory of the apparatus.

22. Apparatus according to claim 19, comprising:
a disk drive for storing an operating system program for use by a SCSI controller of the host computer.

23. Apparatus according to claim 19, wherein the PCI bus controller detects an operating system platform of the host computer.

24. Apparatus according to claim 23, wherein the PCI bus controller adapts to an operating system platform of the host computer.

25. Apparatus according to claim 11, wherein the PCI bus controller is configured to operate as a target device of at least one of a SCSI bus, and a switched fabric.

26. Apparatus for storing data comprising:
a semiconductor memory;
a PCI bus connected to the semiconductor memory;
a PCI bus controller of the PCI bus having a SCSI bus interface, and being configured to operate as a SCSI target device, wherein the PCI bus controller receives requests via the SCSI bus interface including disk drive commands to read and write data at specified locations on a disk drive, and accesses the semiconductor memory via the PCI bus to read and write data in the semiconductor memory at memory addresses corresponding to the specified locations in the received disk drive commands; and
a central processing unit connected to the semiconductor memory via a local bus.

27. Apparatus according to claim 26, in combination with a host computer wherein a protocol is established among the central processing unit, the PCI bus controller and the host computer.

28. Apparatus configured as an electronic semiconductor disk, comprising:
a semiconductor memory;
an adapter for interfacing a first industry standard bus of the apparatus with a second industry standard bus of a host computer; and
a processor programmed to detect an operating system platform of the host computer, and to program the adapter for use as a target mode device of the operating system platform of the host computer for direct access of the semiconductor memory by the host computer, such that the adapter receives, on the second industry standard bus, disk drive commands to read and write data at specified locations on a disk drive, and accesses the semiconductor memory via the first industry standard bus to read and write data in the semiconductor memory at memory addresses corresponding to the specified locations in the received disk drive commands.

29. Apparatus according to claim 28, wherein the adapter comprises:
a programmable SCSI control unit.

30. Apparatus according to claim 29, wherein the adapter includes a local memory for storing an operating system of the programmable SCSI control unit.

31. Apparatus according to claim 29, in combination with a host computer, comprising:
a SCSI controller of the host computer.

32. Apparatus according to claim 28, comprising: a disk memory for storing an operating system of the adapter.

33. Apparatus according to claim 28, wherein the adapter adapts the electronic semiconductor disk to a switched fabric architecture.

34. Apparatus according to claim 33, wherein the adapter is a target channel adapter of an InfiniBand Architecture.

35. Apparatus according to claim 28, wherein the adapter is configured to operate as a SCSI target device.

36. Method performed by an electronic semiconductor disk for storing data in the electronic semiconductor disk, the electronic semiconductor disk being connected to a host bus of a standardized host architecture, the method comprising:
placing an adapter of the electronic semiconductor disk, connected to the host bus, into a target mode of operation;
determining an interface protocol of the host and adaptively coupling the electronic semiconductor disk to the host interface protocol;
receiving disk drive commands requesting access to data at specified locations on a disk drive according to the host interface protocol via the adapter; and
accessing data in the semiconductor memory via an industry standard bus in response to the disk drive commands using memory addresses corresponding to the specified locations in the received disk drive commands.

37. Method according to claim 36, wherein the adapter includes a PCI bus interface.

38. Method according to claim 36, wherein the adapter accesses an operating system in at least one of a local memory and a memory accessed via a network connection using an Ethernet protocol.

39. Method according to claim 36, wherein the adapter accesses an operating system stored in an external memory, the external memory being at least one of a compact disk and a diskette.

40. Method according to claim 36, comprising:
detecting an operating system platform of a host controller connected to the electronic semiconductor disk; and
adapting operating of the adapter to the detected operating system platform.

41. Method according to claim 36, comprising:
managing access to the electronic semiconductor disk remotely via a network connection.

42. Method according to claim 36, comprising:
encrypting an operating system used to control access to information stored on the electronic semiconductor disk; and
controlling access to the operating system via password protection.

43. Method according to claim 42, wherein the password comprises:
comparing a password provided within the operating system program with a password stored within a display device connected to the electronic semiconductor disk.

44. Method according to claim 36, wherein the adapter adapts the electronic semiconductor disk to interface with a switched fabric architecture.

45. Method according to claim 44, wherein the adapter is a target channel of an InfiniBand Architecture.

46. Method according to claim 36, wherein the adapter is configured to operate as a SCSI target device.

47. Method according to claim 36, wherein the adapter interfaces a PCI bus of the electronic semiconductor disk with an external SCSI bus.

48. Method according to claim 36, wherein the adaptor interfaces a PCI bus with a Fibre Channel bus.

49. Method according to claim 36, wherein the adaptor interfaces a PCI bus with an Ethernet connection.

50. An electronic semiconductor disk, comprising:
a processor;
a standard disk drive interface connected to the processor and that communicates with a host device to receive disk drive commands, including commands to read and write data at specified locations on a disk drive;
a bus;
a semiconductor memory connected to the bus; and
wherein the processor receives commands and data through the standard disk drive interface and accesses the semiconductor memory through the bus to read and write data in the semiconductor memory at memory addresses corresponding to the specified locations in the disk drive commands received from the host device.

* * * * *